United States Patent
Mayell et al.

(10) Patent No.: US 10,797,583 B2
(45) Date of Patent: Oct. 6, 2020

(54) SECONDARY WINDING SENSE FOR HARD SWITCH DETECTION

(71) Applicant: POWER INTEGRATIONS, INC., San Jose, CA (US)

(72) Inventors: Robert J. Mayell, Los Altos, CA (US); Hartley Fred Horwitz, Ottawa (CA); Igor Miletic, Ottawa (CA); Roger Colbeck, Ottawa (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/219,508

(22) Filed: Dec. 13, 2018

(65) Prior Publication Data

US 2020/0195124 A1    Jun. 18, 2020

(51) Int. Cl.
- *H02M 3/335* (2006.01)
- *H02M 1/096* (2006.01)
- *H02M 3/156* (2006.01)
- *H02M 1/00* (2006.01)

(52) U.S. Cl.
CPC ........... *H02M 1/096* (2013.01); *H02M 3/156* (2013.01); *H02M 3/33569* (2013.01); *H02M 2001/0025* (2013.01); *H02M 2001/0041* (2013.01)

(58) Field of Classification Search
CPC ............. H02M 3/335; H02M 3/33569; H02M 3/33515; H02M 3/33507; H02M 3/33523; H02M 3/33553; H02M 3/337; H02M 3/3372; H02M 3/157; H02M 3/158; H02M 3/1582; H02M 3/1584; H02M 3/1588
See application file for complete search history.

(56) References Cited

U.S. PATENT DOCUMENTS

| 8,379,420 B2 | 2/2013 | Orr |
| 8,508,958 B2 | 8/2013 | Orr et al. |
| 8,711,580 B2 | 4/2014 | Zhang et al. |

(Continued)

FOREIGN PATENT DOCUMENTS

WO    WO 2018/097820 A1    5/2018

OTHER PUBLICATIONS

TEA19161T—Digital Controller for High-Efficiency Resonant Power Supply, Rev. 1, Mar. 10, 2016, 46 pages.

(Continued)

*Primary Examiner* — Thienvu V Tran
*Assistant Examiner* — Nusrat Quddus
(74) *Attorney, Agent, or Firm* — Christensen O'Connor Johnson Kindness PLLC

(57) ABSTRACT

A controller for use in a power converter includes a control loop clock generator that is coupled to generate a switching frequency signal in response to a sense signal representative of a characteristic of the power converter, a load signal responsive to an output load of the power converter, and a hard switch sense output. A hard switch sense circuit is coupled to generate the hard switch sense output in response to the switching frequency signal and a rectifier conduction signal that is representative of a polarity of an energy transfer element of the power converter. A request transmitter circuit is coupled to generate a request signal in response to the switching frequency signal to control switching of a switching circuit coupled to an input of the energy transfer element of the power converter.

37 Claims, 13 Drawing Sheets

(56) References Cited

U.S. PATENT DOCUMENTS

| | | |
|---|---|---|
| 9,112,425 B2 | 8/2015 | Prescott et al. |
| 9,250,640 B1 | 2/2016 | Chaktraborty |
| 9,362,737 B2 * | 6/2016 | Yang .................. H02M 1/32 |
| 9,966,837 B1 * | 5/2018 | Seaton ................ H02M 3/155 |
| 10,050,546 B1 | 8/2018 | Choi et al. |
| 10,069,403 B1 | 9/2018 | Lim et al. |
| 10,116,219 B2 | 10/2018 | Chen et al. |
| 10,122,367 B1 * | 11/2018 | Albertini ............. H03L 7/0807 |
| 2012/0043905 A1 | 2/2012 | Christensen et al. |
| 2013/0293267 A1 | 11/2013 | Gravati et al. |
| 2014/0078784 A1 | 3/2014 | Nishijima |
| 2015/0303812 A1 * | 10/2015 | Mao ................ H02M 3/33515 |
| | | 363/21.13 |
| 2019/0229637 A1 * | 7/2019 | Albertini ......... H02M 3/33584 |

OTHER PUBLICATIONS

International Patent Application No. PCT/US2019/065433—International Search Report and Written Opinion dated Apr. 9, 2020, 18 pages.

\* cited by examiner

SECONDARY WINDING SENSE FOR HARD SWITCH DETECTION

BACKGROUND INFORMATION

Field of the Disclosure

The present invention relates generally to power converters, and more specifically to switched mode power converters.

Background

Electronic devices use power to operate. Switched mode power converters are commonly used due to their high efficiency, small size, and low weight to power may of today's electronics. Conventional wall sockets provide a high voltage alternating current (ac). In a switching power converter, the high voltage ac input is converted to provide a well-regulated direct current (dc) output through an energy transfer element. The switched mode power converter usually provides output regulation by sensing one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter. Varying the duty cycle may be referred to as pulse width modulation (PWM) control, while varying the switching frequency may be referred to as pulse frequency modulation (PFM) control.

One type of switched mode power converter topology is a resonant switched mode power converter, which utilizes a resonant inductance-capacitance (LC) circuit as part of the power conversion process. In general, resonant switched mode power converters with PFM control may have some advantages compared to non-resonant converters, such as operating at higher switching frequencies with lower switching loss, utilizing smaller magnetic elements (and therefore utilizing smaller packaging), all while operating with high efficiency. Resonant power converters generally do not have waveforms with sharp edges (e.g., waveforms having high di/dt or dv/dt) and as such electromagnetic interference (EMI) performance may be improved, which allows the use of smaller EMI filters as compared to non-resonant converters.

LLC converters are a type of resonant switched mode power converter, which utilizes the resonance between two inductors and a capacitor. LLC converters are popular due to the savings on cost and size by utilizing the magnetizing and leakage inductance of the power converter's energy transfer element as part of the resonance component of the LLC converter. In addition, LLC converters may achieve stability when they are operated at above resonance (i.e., operated at a switching frequency greater than the resonant frequency of the LLC) with zero voltage switching, which may result in lower switching losses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
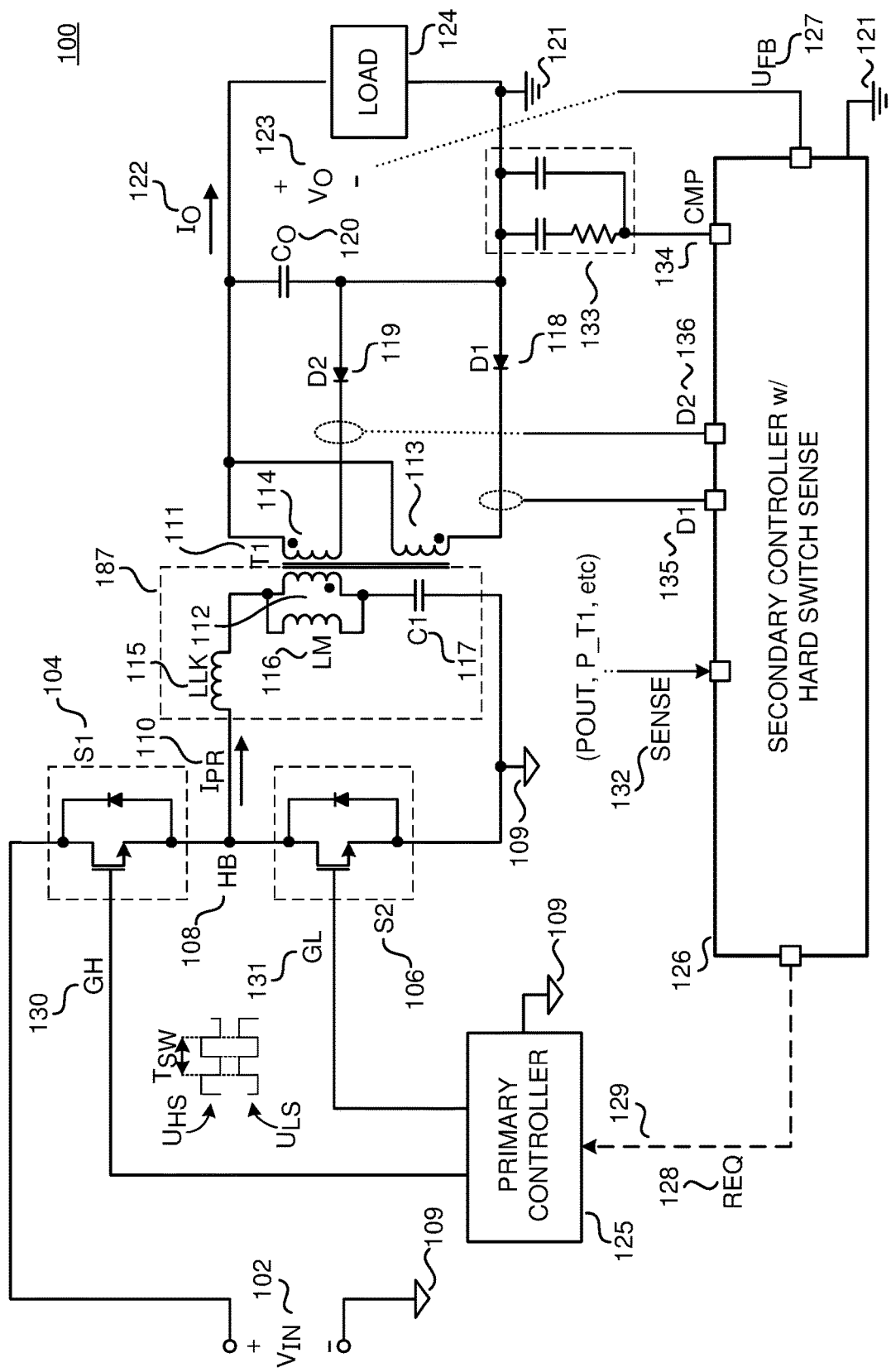
FIG. 1A is a functional block diagram illustrating one example of a power converter with a secondary controller with a hard switch sense block in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a resonant switched mode power converter in which hard switch detection is achieved from sensing the secondary winding are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Resonant converters, such as LLC converters, typically include a resonant tank circuit that includes a tank inductance and a tank capacitance, as found for instance in LLC circuits. Resonant converters may take advantage of soft switching control to provide output voltage without the associated high switching losses, high switching stress on the power switch, and high EMI caused by fast switching edges.

Soft switching the power switch of an LLC converter may also enable zero voltage switching (ZVS) in which the voltage across the power switch is zero prior to or at the instant the power switch is turned ON which may reduce the switching losses for the LLC converter. For an example of a half-bridge LLC converter, two power switches (referred to as a high side switch and a low side switch in a half bridge switching circuit) are used to control the transfer of energy from the input of the power converter to the output of the power converter. The power switches are controlled such that when one power switch is ON, the other power switch is OFF, and the two power switches are generally controlled to be ON for substantially equal amounts of time under steady-state conditions. In general, a switch that is ON (or closed), may conduct current, while a switch that is OFF (or open) does not typically conduct current. In one example, the first switch is ON while the second switch is OFF. The first switch is turned OFF with a non-zero current. After the first switch turns OFF, the voltage across the second switch will typically fall.

Soft switching generally refers to turning ON the second switch as the voltage across the second switch reaches near-zero. Using this type of switching prevents energy loss from discharge of the capacitance across the terminals of the switch during switch turn-on. To achieve ZVS, the power switches are controlled such that there is a period of time, referred to as "dead time," where both power switches are OFF prior to one of the power switches turning ON. Further, during the "dead time" period when both switches are OFF, the voltage across one of the power switches may be reduced to zero and once at zero volts, this switch could be turned ON with minimal switching loss (achieving ZVS).

In other words, soft switching may generally refer to turning on either the high side switch or the low side switch when there is non-zero tank current in the resonant tank circuit of an LLC converter and the voltage across the terminals of the high side switch or the low side switch is at a minimum. Hard switching generally refers to turning ON the high side switch or the low side switch when the tank current is substantially zero, or flowing in the opposite direction, allowing the voltage across the terminals of the high side switch or low side switch to be substantially non-zero. Worded differently, hard switching refers to turn ON either the low side switch or the high side switch when its current is substantially zero or flowing in the opposite direction. When the high side switch and low side switches are hard switching (ZVS is not possible), switching losses occur. Under certain conditions, there may be substantially zero tank current in the resonant tank circuit. In one example, the tank current is zero when both the high side switch and the low side switch have been turned off for a long enough period of time such that there is no tank current. In another example, a load increase at the output of the power converter could lead to a depletion of the tank current. As the load increases, the resonant converter may fall into an "overload condition" and too much energy is taken from the resonant tank circuit and the remaining tank current at switch turn-off approaches zero. In other words, the "overload condition" may take too much energy from the resonant tank circuit and the tank current falls to zero or reverses direction, driving the half bridge voltage in the opposite direction before the switch turns on.

For an example of a half-bridge LLC converter, the high side switch and low side switch are generally controlled to be ON for substantially equal amounts of time under steady-state conditions and their operation may be characterized by its switching period, which is the inverse of the switching frequency. In general, the on-time of either the high side switch or low side switch is substantially equal to the off-time under steady-state conditions. As such, the switching period may be made up of two half cycles, which are substantially equal under steady state conditions. During one of these two half cycles, either the high side switch or the low side switch is ON. For the subsequent half cycle, the switch that was not conducting during the previous half cycle is ON and the switch that was previously conducting is now OFF.

For the LLC converter to deliver more power, the switching period of the high side switch and the low side switch is increased (i.e., the switching frequency is decreased). As such, the periods of the half cycles (thus the on-times of the power switches) are also increased. When the load suddenly increases, the sudden increase in the switching period (and as such, the periods of the half cycles) can cause too much energy to be taken from the resonant tank circuit and the end of cycle tank current (at the end of the half cycle) approaches zero. Further increase in the load can cause the resonant tank current to reverse direction before the end of the half cycle.

Hard switching may generally be detected by directly sensing the tank current on the primary side of the power converter. When the tank current reaches zero or is near zero, hard switching occurs. As will be discussed, examples in accordance with the teachings of the present invention sense the boundaries of hard switching by indirectly sensing the tank current on the secondary side of the power converter by sensing the voltage changes on one or more secondary windings. For example, the polarity of the voltage of one or more secondary windings changes from positive to negative, or vice versa, around the time that the tank current is substantially equal to zero. A hard switch phase angle can refer to the ratio of the amount of time that occurs between the turn ON of either the high side or low side power switch and the secondary winding polarity change. Under no-load conditions, the secondary winding polarity change occurs in the middle of a half cycle. As the load increases, the secondary winding polarity change occurs closer to the beginning of the half cycle. At or near the boundary of hard-switching, the secondary winding polarity change occurs almost coincident with associated primary switch turn ON. If operating deeply in overload conditions, hard switching will cause the winding polarity change before the associated primary switch turn ON. As such, a hard switch phase angle threshold can be utilized to indirectly sense when the power converter is hard switching in accordance with the teachings of the present invention.

To illustrate, FIG. 1A illustrates a functional block diagram of an example power converter 100 and controller including a hard switch sense block 132. Also shown is a primary controller 125 and a secondary controller 126, which together may be referred to as the controller of the power converter 100. As shown, the primary controller 125 is on the primary side of the power converter 100 and referenced to input return 109, while the secondary controller 126 is on the secondary side of the power converter 100 and referenced to output return 121. However, it should be appreciated that the primary controller 125 and the secondary controller 126 may not be isolated from each other and one or more elements included in the secondary controller 126 may be included in the primary controller 125 and vice versa. The power converter 100 shown is a resonant power converter coupled in a half-bridge topology with rectifiers at its output. It should be appreciated that other power converter topologies (resonant or not, isolated, or non-isolated) could be used with embodiments of the present invention. Further, synchronous rectifiers may also be used for the output rectifiers.

In the depicted example, the power converter 100 is shown as including a switching circuit, which includes switches S1 104 and S2 106, coupled to an input of the power converter 100 and an energy transfer element T1 111 coupled between the input and the output of the power converter 100. The primary controller 125 is coupled to generate first and second drive signals GH 130 and GL 131 to control switching of switches S1 104 and S2 106, respectively. Switch S1 104 may also be referred to as a high side switch while switch S2 106 may be referred to as a low side switch. A resonant tank circuit 187 is also coupled to switches S1 104 and S2 106. The resonant tank circuit 187 includes a tank inductance and a tank capacitance. In the depicted example, the resonant tank circuit 187 is an LLC circuit such that the tank inductance includes a leakage inductance LLK 115 and a transformer magnetizing inductance LM 116 of the energy transfer element T1 111. The tank capacitance includes capacitance C1 117. The leakage inductance LLK 115 and the transformer magnetizing inductance LM 116 may be either discrete components (discrete magnetic structures) or combined into a single transformer (single magnetic structure) with leakage and magnetizing elements, such as the energy transfer element T1 111. The tank current of the resonant tank circuit is shown as primary current $I_{PR}$ 110.

As illustrated, the power converter 100 is coupled to receive an input voltage VIN 102 on the primary side and provide output power to the load 124 coupled to the output of the power converter 100 on the secondary side. High side switch S1 104 is coupled to receive the input voltage VIN 102 at one end, and coupled to the low side switch S2 106 at the other end. The low side switch S2 106 is further coupled to input return 109. The terminal between the high side switch S1 104 and the low side switch S2 106 may be referred to as the half bridge node HB 108. In the example shown, both the high side switch S1 104 and the low side switch S2 106 are illustrated as n-type metal-oxide-semiconductor field-effect transistors (MOSFETs) along with their respective body diodes. The high side switch S1 104 and the low side switch S2 106 are controlled with first and second drive signals GH 130 and GL 131 such that the voltage applied to the input of the resonant tank 187 (i.e., the voltage at the half bridge node HB 108) is substantially a square wave.

As shown, the energy transfer element T1 111 includes the primary winding 112, a first output winding 113, and a second output winding 114. The dots on the windings of the energy transfer element T1 111 signify a point of equivalent polarity of coupling between the windings. As illustrated, the primary winding 112 is coupled in parallel with the magnetizing inductor LM 116 so that the in-phase winding terminal, as indicated by the dot, connects to capacitor C1 117. The primary winding 111 is coupled to the high side switch S1 104 and low side switch S2 106. The first output winding 113 is coupled to output rectifier D1 118 while the second output winding 114 is coupled to output rectifier D2 119. As shown, rectifiers D1 118 and D2 119 are diodes. However, in another example, rectifiers D1 118 and D2 119 may be transistors used as synchronous rectifiers and could be controlled by signals outputted by the secondary controller 126. Energy is transferred and rectified by output rectifier D1 118 when the high side switch S1 104 is turned ON and the low side switch S2 106 is turned OFF. When the high side switch S1 104 is turned OFF and the low side switch S2 106 is turned ON, energy is transferred and rectified by output rectifier D2 119. One end of the output capacitor $C_O$ 120 is coupled to rectifiers D1 118, D2 119, and output return 121. The other end of the output capacitor $C_O$ 120 is coupled to the first output winding 113 and the second output winding 114. The load 124 is coupled across the output capacitor $C_O$ 120. An output may be provided to the load 124 and may be provided as either an output voltage $V_O$ 123, output current $I_O$ 122, or a combination of the two.

Power converter 100 can have a primary side and a secondary side, which in one example are galvanically isolated from each other. It should be appreciated that embodiments of the present disclosure may be used with non-isolated power converters as well. A controller coupled to the primary side on an input side of the power converter is generally referred to as a primary controller while a controller coupled to the secondary side on the output side of the power converter is referred to as a secondary controller. The primary controller 125 and secondary controller 126 may communicate via a communication link 129 across the galvanic isolation using an inductive coupling such as a transformer or a coupled inductor, an optocoupler, or other devices that provide isolation. The primary controller 125 and secondary controller 126 can be implemented on separate integrated circuit (IC) dice that can either be packaged in a single IC package or packaged in separate IC packages. An integrated circuit package typically includes a lead frame to provide mechanical support for the die or dice within the IC package.

The power converter 100 further includes circuitry to regulate the output. A feedback signal $U_{FB}$ 127 representative of the output of the power converter 100 (output voltage $V_O$ 123, output current $I_O$ 122, or a combination of the two) is provided to the secondary controller 126 and may be a voltage signal or a current signal. The secondary controller 126 is coupled to receive the feedback signal $U_{FB}$ 127 and outputs a request signal REQ 128. In response to the feedback signal $U_{FB}$ 127, the secondary controller 126 determines whether energy should be delivered from the primary side to the secondary side of the power converter 100. Secondary controller 126 outputs the request signal REQ 128 to the primary controller 125 via the communication link 129. The communication link 129 may provide galvanic isolation between primary controller 125 and the secondary controller 126 and may be implemented by using devices such as an opto-coupler, a capacitor, a magnetic coupling, or an inductive coupling. In one example, the inductive coupling that forms the communication link 129 may include conductive loops formed of lead frames that support the primary controller 125 and secondary controller 126.

The request signal REQ 128 may be representative of one or more commands to control the switching of the high side switch S1 104 and the low side switch S2 106. The request signal REQ 128 may be a rectangular pulse waveform that pulses to a logic high value and quickly returns to a logic low value. For example, a grouping of M number of pulses in the request signal REQ 128 may correspond to a "burst on" command and the primary controller 125 begins switching either the high side switch S1 104 or the low side switch S2 106. A single pulse in the request signal REQ 128 may correspond to a "switch" command and the primary controller 125 turns OFF whichever high side switch S1 104 or low side switch S2 106 is currently conducting, and turns ON whichever switch was not conducting. Further, a grouping of N number of pulses in the request signal REQ 128 may correspond to a "burst off" command and the primary controller 125 stops switching both the high side switch S1 104 and the low side switch S2 106. The primary controller 125 could include a decoder to decode the commands from the request signal REQ 128. However, it should be appreciated that other schemes, such as pulse width modulation, frequency modulation, or other techniques could be used to transmit burst on, burst off, and switch commands.

The secondary controller 126 determines the switching frequency or switching period of the high side switch S1 104 and the low side switch S2 106. In one example, the secondary controller receives a sense signal SENSE 132 which may be representative of multiple characteristics of the power converter 100. In one example, the sense signal SENSE 132 may include the magnitude of the input voltage $V_{IN}$ 102 and may be a voltage or current signal. The sense signal SENSE 132 may also be representative of the sensed output power (POUT), power delivered by the energy transfer element T1 111 (P_T1), input power or power processed by the converter and may be a voltage signal or a current signal. The secondary controller 126 utilizes the feedback single $U_{FB}$ 127 and the sense signal SENSE 132 to determine the time between pulses of the request signal REQ 128, which is related to the switching frequency or switching period of the high side switch S1 104 and the low side switch S2 106 and the subsequent on-times of switches S1 104 and S2 106. However, it should be appreciated that the sense signal SENSE 132 may or may not be present. The secondary controller 126 may utilize the feedback signal $U_{FB}$ 127 to determine the time between pulses of the request signal REQ 128 and the subsequent on-times of switch S1 104 and switch S2 106.

Secondary controller 126 is coupled to receive a rectifier conduction signal that is representative of the polarity of the energy transfer element T1 111 power converter 100. In various examples, the instant of changes in the polarity of the voltage in the rectifier conduction signal indicate that the primary current $I_{PR}$ 110 in the primary winding 112 of the energy transfer element T1 111 is substantially zero. In one example, the rectifier conduction signal includes a first winding signal D1 135, which is representative of the voltage of the first output winding 113, and the second winding signal D2 136, which is representative of the voltage of the second output winding 114. As shown, first winding signal D1 135 is the voltage at the cathode of rectifier 118, while the second winding signal D2 136 is the voltage at the cathode of rectifier 119. For the case of synchronous rectifiers, the first winding signal D1 135 and the second winding signal D2 136 would be the voltage of the drain of the respective synchronous rectifiers. As will be further discussed, the secondary controller 126 includes hard switch sensing. Hard switch is sensed by indirectly sensing the primary current $I_{PR}$ 110 (tank current) from the secondary side of the power converter 100 by sensing the voltage changes of the first output winding 113 and the second output winding 114. For example, the polarity of the voltage for either the first output winding 113 or the second output winding 114 can change from positive to negative, or vice versa, around the time that the tank current is substantially equal to zero. Hard switching may be sensed by comparing this voltage polarity change with the switching of the high side switch S1 104 and the low side switch S2 106.

Figure 1B:
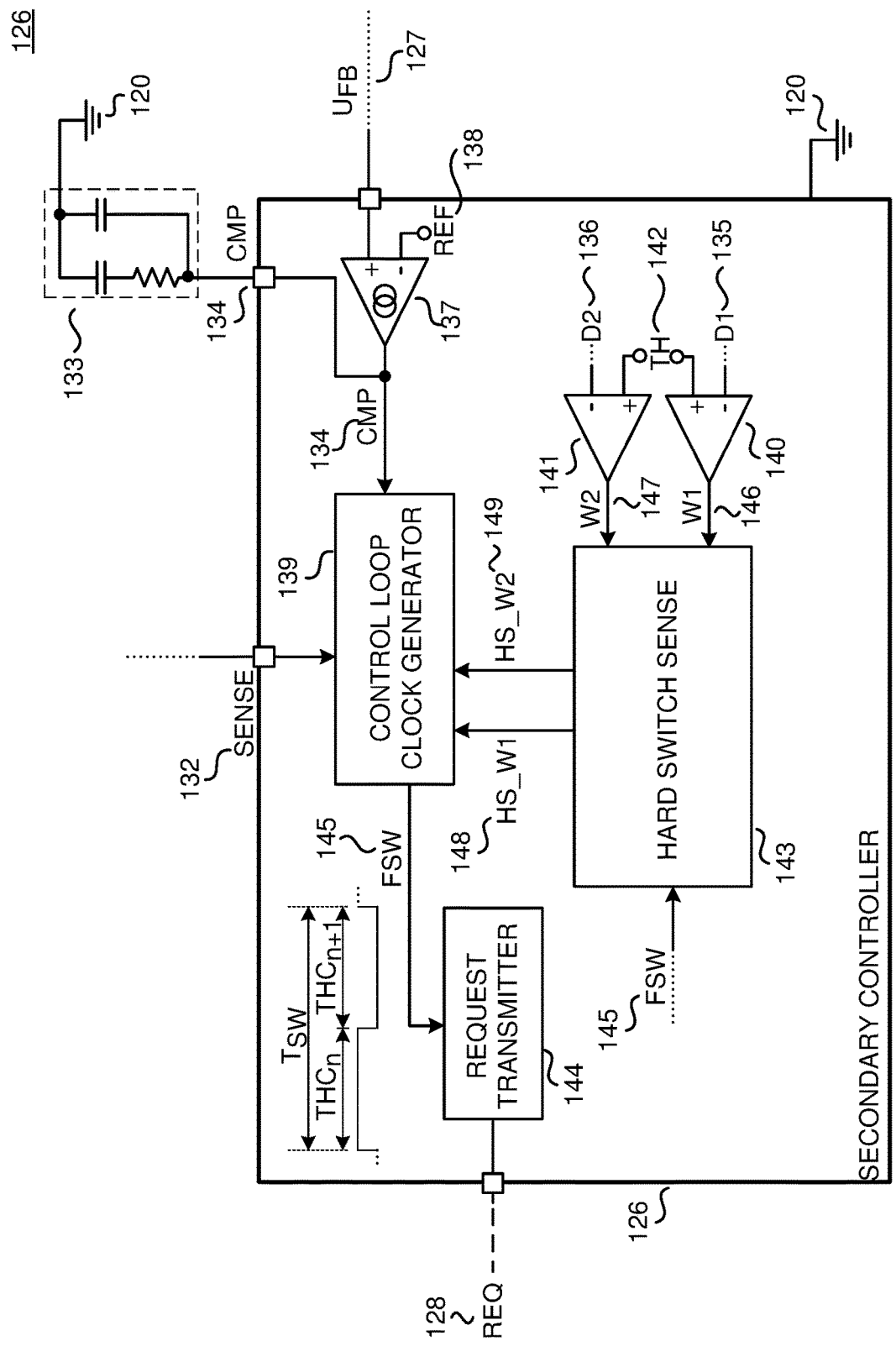
FIG. 1B is a functional block diagram illustrating an example secondary controller with hard switch sense block of FIG. 1A in accordance with the teachings of the present invention.

FIG. 1B illustrates a functional block diagram of one example secondary controller 126 in accordance with the teachings of the present invention. It is appreciated that secondary controller 126 of FIG. 1B shares many similarities with the example of secondary controller 126 of FIG. 1A, and that similarly named and numbered elements referenced below may be coupled and function similar to as described above. In the example of FIG. 1B, secondary controller 126 includes a transconductance amplifier 137 (also referred to as a feedback reference circuit), control loop clock generator 139, comparator 140, comparator 141, hard switch sense block 143, and request transmitter 144. Transconductance amplifier 137 (i.e., feedback reference circuit) is coupled to receive the feedback signal $U_{FB}$ 127 and a feedback reference 138. The output of the transconductance amplifier 137 (i.e., feedback reference circuit) is the load signal CMP 134. In operation, the output of the transconductance amplifier 137 is a current responsive to the difference between the feedback signal $U_{FB}$ 127 and feedback reference 138. The greater the difference between the feedback signal $U_{FB}$ 127 and feedback reference 138, the larger the output current of the transconductance amplifier 137. The output of the transconductance amplifier 137 may be coupled to a compensation circuit 133, which is shown external to the secondary controller 126. In the example shown, the compensation circuit 133 is coupled to output return 121 and includes a resistor and capacitor coupled together in series along with a capacitor coupled in parallel to the series coupled resistor/capacitor. The compensation circuit 133 provides loop compensation for the feedback loop of the power converter 100. Further, the compensation circuit 133 may alter the response time of the feedback loop of the power converter 100. With the compensation circuit 133, the load signal CMP 134 received by the control loop clock generator 139 may be a voltage signal. In one example, a larger value for the load signal CMP 134 corresponds to a smaller output load 124. In other words, the load signal CMP 134 increases as the load 124 decreases.

In the example shown, the control loop clock generator 139 receives the sense signal SENSE 132 and the load signal CMP 134 and outputs the switching frequency signal FSW 145 to the request transmitter 144. The switching frequency signal FSW 145 is representative of the switching frequency of the primary switches (S1 104 and S2 106) and may be a rectangular pulse waveform with logic high and logic low sections. The control loop clock generator 139 utilizes the sense signal SENSE 132 and the load signal CMP 134 to determine the lengths of the logic high and logic low sections. It should be appreciated that the sense signal SENSE 132 maybe optional, and the control loop clock generator 139 can include a voltage controlled oscillator (VCO) or other schemes which are responsive to the load signal CMP 134 to determine the lengths of the logic high and logic low sections.

For an LLC converter, the logic high and logic low sections are generally of equal length during steady state conditions. The time between consecutive leading edges (e.g., consecutive rising edges) for the switching frequency signal FSW 145 is referred to as the switching period $T_{SW}$. Or in other words, the sum of the length of the logic high section and the logic low section is the switching period $T_{SW}$ of the switching frequency signal FSW 145. The switching period $T_{SW}$ of the switching frequency signal FSW 145 is generally also the switching period for the high side switch S1 104 and the low side switch S2 106. However, there may be a period of time, referred to as "dead time," where both the high side switch S1 104 and the low side switch S2 106 are OFF prior to one of those switches turning ON to allow the voltage across that switch to reduce to zero, achieving ZVS. When dead time is utilized, the switching period for the high side switch S1 104 and the low side switch S2 106 is substantially the switching period $T_{SW}$ of the switching frequency signal FSW 141 plus the dead time after turning off the high side switch S1 104 and the dead time after turning off the low side switch S2 106.

Each switching period $T_{SW}$ for the switching frequency signal FSW 145 includes two half cycles. The switching frequency signal FSW 145 is logic high during one of these half cycles and logic low during the other half cycle. In one example, the high side switch S1 104 is ON (i.e., may conduct current) when the switching frequency signal FSW 145 is logic high, while the low side switch S2 106 is ON (i.e., may conduct current) when the switching frequency signal FSW 145 is logic low. The switching period $T_{SW}$ and the lengths of the half cycles are used to control the amount of energy delivered to the load 124. In one example, the longer the switching period $T_{SW}$ (i.e., the longer the half cycles), the more energy is delivered to the output of the power converter 100 and the load 124 due to the gain of the resonant tank 187.

Under steady state conditions, the two half cycles are substantially equal. However under transient conditions, such as a varying load, sudden changes in input voltage, etc., the lengths of the two half cycles are not equal, thereby varying the overall switching period $T_{SW}$ to bring the output of the power converter into regulation. For the example of an increasing load, the two half cycles and the overall switching period $T_{SW}$ will progressively increase to regulate the output of the power converter 100. When the hard switch sense block 143 senses that the power converter is operating at the boundary of hard switching or is hard switching, the half cycle can be terminated. The termination of the half cycle when a hard switch event is detected may alleviate some of the issues with hard switching. As will be further discussed, the hard switch sense block 143 generates a hard switch sense output, which in one example includes hard switch sense signals HS_W1 148 and HS_W2 149. The control loop clock generator 139 receives the hard switch sense signals HS_W1 148 and HS_W2 149 from the hard switch sense block 143. Signal HS_W1 148 is representative of detection of hard switching from the first output winding 113 while signal HS_W2 149 is representative of detection of hard switching from the second output winding 114. When either signal HS_W1 148 or HS_W2 149 is asserted, the control loop clock generator 139 ends the current half cycle by transitioning the switching frequency signal FSW 145 from logic high to logic low or vice versa.

The switching frequency signal FSW 145 is received by the request transmitter 144. The frequency of the request signal REQ 128 is responsive to the switching frequency/period set by the switching frequency signal FSW 145. In one example, at every leading edge and at every trailing edge of the switching frequency signal FSW 145, the request transmitter 144 outputs a pulse in the request signal REQ 128 to turn on either the high side switch S1 104 or the low side switch S2 106. In one example, a leading edge in the switching frequency FSW 145 (e.g., a rising edge) corresponds to turning ON the high side switch S1 104 (and turning OFF the low side switch S2 106), while a trailing edge in the switching frequency FSW 145 (e.g., falling edge) corresponds to turning ON the low side switch S2 106 (and turning OFF the high side switch S1 104). In other words, a logic high value of the switching frequency signal FSW 145 generally corresponds to the conduction time of the high side switch S1 104 while a logic low generally corresponds to the conduction time of the low side switch S2 106. It should be appreciated that there may also be dead time between turning off the high side switch S1 104 and turning on the low side switch S2 106 and vice versa. As shown, the time between consecutive leading edges (or consecutive trailing edges) is substantially the switching period $T_{SW}$. The time between consecutive edges is substantially the length of a half cycle.

Secondary controller 126 is coupled to receive a rectifier conduction signal that is representative of the output of the energy transfer element T1 111 power converter 100. In various examples, changes in the polarity of the voltage in the rectifier conduction signal indicate that the primary current in the primary winding 112 of the energy transfer element T1 111 is substantially zero. In one example, the rectifier conduction signal includes a first winding signal D1 135, which is representative of the voltage of the first output winding 113, and the second winding signal D2 136, which is representative of the voltage of the second output winding 114. As shown, first winding signal D1 135 is the voltage at the cathode of rectifier 118, while the second winding signal D2 136 is the voltage at the cathode of rectifier 119. For the case of synchronous rectifiers, the first winding signal D1 135 and the second winding signal D2 136 would be the voltage of the drain of the respective synchronous rectifiers.

Comparator 140 is coupled to receive the first winding signal D1 135 and threshold TH 142, and outputs first winding clock W1 146. The first winding clock W1 146 is a rectangular pulse waveform with varying durations of logic high and logic low sections. In one example, threshold TH 142 is a winding threshold that is substantially near zero or below zero volts and the first winding clock W1 146 indicates the polarity of the first winding signal D1 135. Edges of the first winding clock W1 146 would represent a change in polarity of the first winding signal D1 135. In one example, a logic high value for first winding clock W1 146 corresponds to a negative polarity of the first winding signal D1 135, while a logic low value corresponds to a positive polarity of the first winding signal D1 135. Stated in another way, the first winding clock W1 146 may be representative of the conduction of rectifier 118. For example, the first winding clock W1 146 may be logic high when rectifier 118 is conducting and logic low when rectifier 118 is not conducting. As shown, the threshold TH 142 is received at the non-inverting input of comparator 140 while the first winding signal D1 135 is received at the inverting input.

Similarly, comparator 141 is coupled to receive the second winding signal D2 136 and threshold TH 142, and outputs the second winding clock W2 147. The second winding clock W2 147 is a rectangular pulse waveform with varying durations of logic high and logic low sections. In one example, threshold TH 142 is substantially near zero or below zero volts and the second winding clock W2 147 indicates the polarity of the second winding signal D2 136. Edges of the second winding clock W2 147 would represent a change in polarity of the second winding signal D2 136. In one example, a logic high value for second winding clock W2 147 corresponds to a negative polarity of the second winding signal D2 136, while a logic low value corresponds to a positive polarity of the second winding signal D2 136. Stated in another way, the second winding clock W2 147 may be representative of the conduction of rectifier 119. For example, the second winding clock W2 147 may be logic high when rectifier 119 is conducting and logic low when rectifier 119 is not conducting. As shown, the threshold TH 142 is received at the non-inverting input of comparator 140 while the second winding signal D2 136 is received at the inverting input.

Hard switch sense block 143 is coupled to receive the switching frequency signal FSW 147 and the first winding clock W1 146 and second winding clock W2 147 and outputs hard switch sense signals HS_W1 148 and HS_W2 149. Hard switch sense signal HS_W1 148 is representative of detection of hard switching from the first output winding 113 while hard switch sense signal HS_W2 149 is representative of detection of hard switching from the second output winding 114. When either signal HS_W1 148 or HS_W2 149 is asserted, the control loop clock generator 139 ends the current half cycle by transitioning the switching frequency signal FSW 145 from logic high to logic low or vice versa.

In operation, the hard switch sense block 143 determines if there have been hard switch events by comparing the timing of edges in either of the winding clocks W1 146 and W2 147 to the value of the switching frequency signal FSW 145. Under most normal conditions, a leading edge (e.g., rising edge) in the second winding clock W2 147 should not occur while the switching frequency signal FSW 145 is logic high. If the leading edge in the second winding clock W2 147 occurs while the switching frequency signal FSW 145 is logic high, the hard switch sense block 143 determines that there is a hard switch event and terminates the current half cycle to stop switching of one of the primary side switches. In other words, the hard switch sense block 143 is configured to indicate a hard switch event in response to the second winding clock W2 147 indicating that the output rectifier D2 119 transitions from a non-conducting state to a conducting state when the switching frequency signal FSW 145 is logic high value. For this example, the switching frequency signal FSW 145 transitions to a logic low value and the high side switch S1 104 is turned OFF.

Further, a leading edge (e.g., rising edge) in the first winding clock W1 146 should not occur while the switching frequency signal FSW 145 is logic low under most normal conditions. If a leading edge in the first winding clock W1 146 occurs while the switching frequency signal FSW 145 is logic low, the hard switch sense block 143 determines that there is a hard switching event and terminates the current half cycle to stop switching of one of the primary side switches. In other words, the hard switch sense block 143 is further configured to indicate a hard switch event in response to the first winding clock W1 146 indicating that the output rectifier D1 118 transitions from a non-conducting state to a conducting state when the switching frequency signal FSW 145 is logic low value. For this example, the switching frequency signal FSW 145 transitions to a logic high value and the low side switch S2 106 is turned OFF.

Figure 2A:
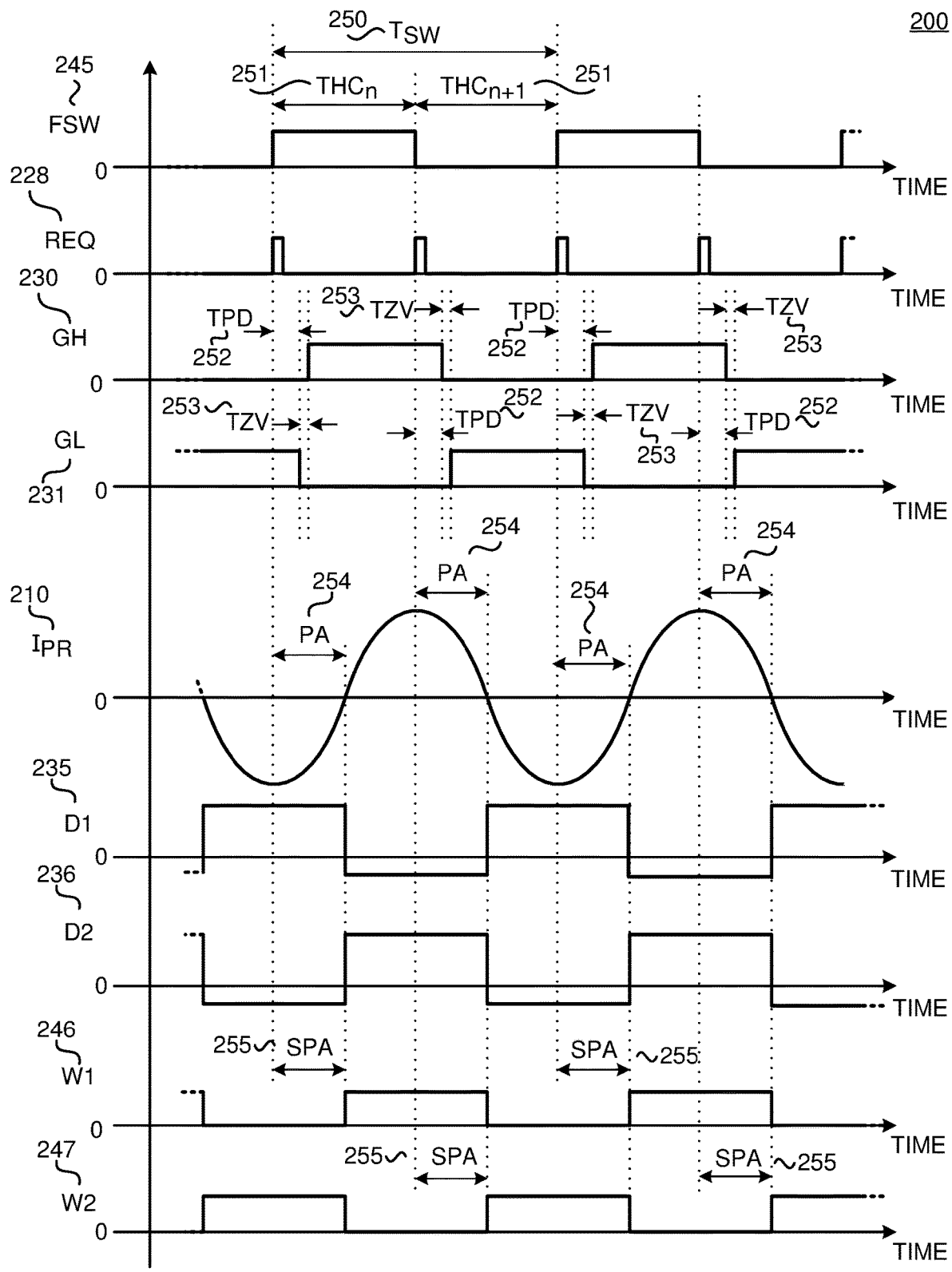
FIG. 2A illustrates a timing diagram with example waveforms for the power converter of FIG. 1 in accordance with the teachings of the present invention.

FIG. 2A is a timing diagram 200 illustrating waveforms for the switching frequency signal FSW 245, request signal REQ 228, first drive signal GH 230, second drive signal GL 231, primary current $I_{PR}$ 210, first winding signal D1 235, second winding signal D2 236, first winding clock W1 246, and second winding clock W2 247, which are example waveforms of similarly named elements discussed in FIG. 1.

The switching frequency signal FSW 245 is a rectangular pulse waveform of varying lengths of logic high and logic low sections. The switching period $T_{SW}$ 250 is shown as the time between leading edges of the switching frequency signal FSW 245 but may also be defined as the time between trailing edges. Switching period $T_{SW}$ 250 is substantially the inverse of the switching frequency. As shown, the switching period $T_{SW}$ 250 may comprise two half cycles 251 with one half cycle $THC_n$ corresponding to a logic high section and another half cycle $THC_{n+1}$ corresponding to the logic low section of the switching period $T_{SW}$ 250. Under steady state conditions, the half cycle $THC_n$ is substantially equal length to half cycle $THC_{n+1}$. If the input voltage 102 or the load 124 changes, the half cycles may increase or decrease over time. When the hard switch sense block senses a hard switch event, the half cycles $THC_n$ or $THC_{n+1}$ may be shortened or terminated once the event has been sensed.

The request signal REQ 228 may be a rectangular pulse waveform with a logic high value at every leading edge and at every trailing edge of the switching frequency signal FSW 245. The request signal REQ 228 is then transmitted to the primary controller to control switching of the high side switch S1 and the low side switch S2 via the first drive signal GH 230 and the second drive signal GL 231, respectively. In one example, logic high sections of the switching frequency signal FSW 245 correspond to a conducting high side switch S1 (and a logic high first drive signal GH 230) and logic low sections of the switching frequency signal FSW 245 correspond to a conducting low side switch (and a logic high second drive signal GL 231). For every leading edge of the switching frequency signal FSW 245, the request signal REQ 228 pulses to a logic high value. The second drive signal GL 231 transitions to a logic low value to turn OFF the low side switch S2 prior to the first drive signal GH 230 transitioning to the logic high value to turn ON the high side switch S1. As shown, there is a propagation delay TPD 252 between the pulse of the request signal REQ 228 and the logic low transition of the second drive signal GL 231 representative of the time to transmit from the secondary controller to the primary controller and the delays of the various circuits within both. Further, FIG. 2A also illustrates the dead time TZV between turning OFF the low side switch S2 (i.e., trailing edge of GL 231) and turning ON the high side switch S1 (i.e., leading edge of GH 230). As mentioned above, if there is non-zero tank current flowing in the proper direction, ZVS may occur.

For every trailing edge of the switching frequency signal FSW 245 the request signal REQ 228 pulses to a logic high value. The first drive signal GH 230 transitions to the logic low value to turn OFF the high side switch S1 prior to the second drive signal GL 231 transitioning to the logic high value to turn ON the low side switch S2. The propagation delay TPD 252 and the dead time TZV 253 between turning OFF the high side switch S1 and turning ON the low side switch are also shown. During the dead time TZV 253 between turning OFF the high side switch S1 and turning ON the low side switch S2, the voltage at the half bridge node (node HB 108 shown in FIG. 1A) will fall due to the current discharging the lumped capacitance at node HB 108. The minimum half bridge HB voltage reached occurs when current through the body diode of the low side switch S2 106, clamps the voltage substantially a negative value near zero. This creates the ZVS condition before the low side switch S2 turns ON.

As shown, the primary current $I_{PR}$ 210 is substantially increasing when the first drive signal GH 230 is logic high and the high side switch S1 is conducting, while the primary current $I_{PR}$ 210 is substantially decreasing when the second drive signal GL 231 is logic high and the low side switch S2 is conducting. For the example shown in FIG. 2A, when the primary current $I_{PR}$ 210 is negative, the output rectifier D1 118 shown in FIG. 1A is in a non-conducting state while the output rectifier D2 119 is in a conducting state. As such, the first winding signal D1 235 is substantially a positive non-zero value (corresponding to two times the output voltage VO) while the second winding signal D2 236 is substantially a negative value near zero (corresponding to the diode voltage drop). Thus, the first winding signal D1 235 is a positive value when in the output rectifier D1 118 is not conducting, and the second winding signal D2 236 is a negative value when in the output rectifier D2 119 is conducting. The first winding clock W1 246 is logic low while the second winding clock W2 247 is logic high. When the primary current $I_{PR}$ 210 is positive, the output rectifier D1 118 shown in FIG. 1 is in a conducting state while the output rectifier D2 119 is in a non-conducting state. As such, the first winding signal D1 235 is substantially a negative value near zero (corresponding to the diode voltage drop) while the second winding signal D2 236 is substantially a positive non-zero value (corresponding to two times the output voltage VO). Thus, the first winding signal D1 235 is a negative value when in the output rectifier D1 118 is conducting, and the second winding signal D2 236 is a positive value when in the output rectifier D2 119 is not conducting. The first winding clock W1 246 is logic high while the second winding clock W2 247 is logic low. It should be appreciated that the duration of time which the output rectifiers D1 118 or D2 119 are conducting may vary with load. For example, the duration of conduction time may decrease with decreasing loads.

For the example shown in FIG. 2A, a phase angle PA 254 for hard switching may be defined as the ratio of time between a pulse in the request signal REQ 228 and the primary current $I_{PR}$ 210 changing polarity (i.e., crossing zero) with respect to the total period TSW. As mentioned above, there is a minimum hard switch phase angle PA 254 to keep the power converter soft-switching (which allows zero voltage switching) and a hard switch phase angle threshold can be utilized to indirectly sense when the power converter is hard switching. In the example shown, the winding sense signals D1 235 and D2 236 generally change polarity around the same time as the zero crossing of the $I_{PR}$ 210. The polarity changes for winding sense signal D1 235 and D2 236 translate to leading and trailing edges in winding clock signals W1 246 and W2 247. A sensed phase angle SPA 255 can be defined as the duration of time between a pulse in the request signal REQ 228 and the leading edge of winding clock signals W1 246 or W2 247.

Figure 2B:
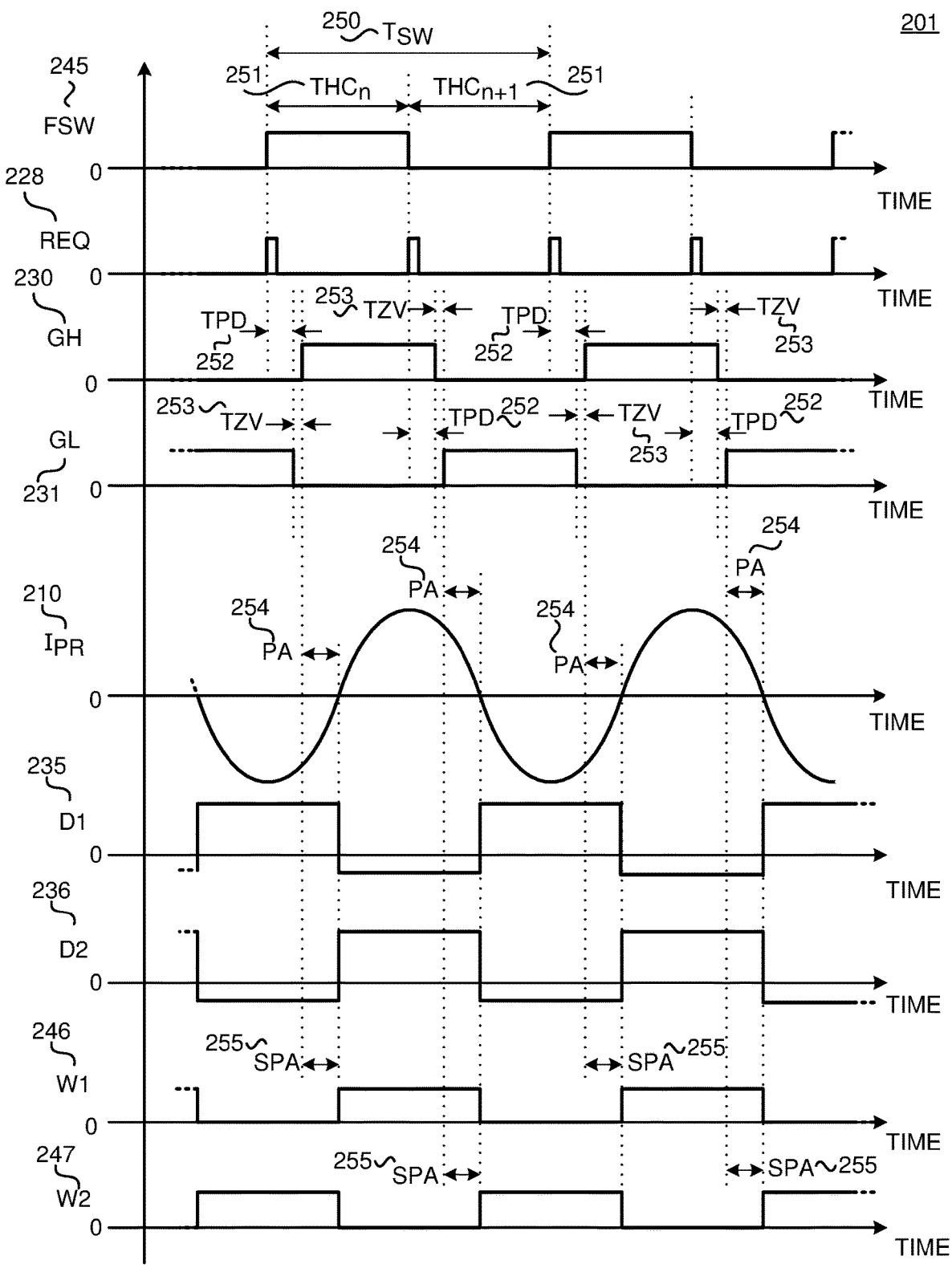
FIG. 2B illustrates another timing diagram with example waveforms the power converter of FIG. 1 in accordance with the teachings of the present invention.

FIG. 2B is another timing diagram 201 illustrating waveforms for the switching frequency signal FSW 245, request signal REQ 228, first drive signal GH 230, second drive signal GL 231, primary current $I_{PR}$ 210, first winding signal D1 235, second winding signal D2 236, first winding clock W1 246, and second winding clock W2 247, which are example waveforms of similarly named elements discussed in FIG. 1A. It should be appreciated that FIG. 2B is similar to FIG. 2A. However, the phase angle PA 254 for hard switching may be defined as the ratio of time between either the high side switch S1 or low side switch S2 switching and the primary current $I_{PR}$ 210 changing polarity (i.e., crossing zero), with respect to the total period TSW. Or in other words, the phase angle PA 254 may be defined as the duration of time between the leading edges of either the first drive signal GH 230 or the second drive signal GL 231 and the primary current $I_{PR}$ 210 changing polarity (i.e., crossing zero). The phase angle 254 is similar to the phase angle shown in FIG. 2A, however the phase angle 254 shown in FIG. 2B does not include the propagation delay TPD 252 and dead time TZV 253. The secondary controller may know the values for the propagation delay TPD 252 and dead time TZV 253 and the sensed phase angle SPA 255 of FIG. 2B can be defined as the duration of time between a pulse in the request signal REQ 228 and the leading edge of winding clock signals W1 246 and W2 247 minus the propagation delay TPD 252 and dead time TZV 253.

Figure 3:
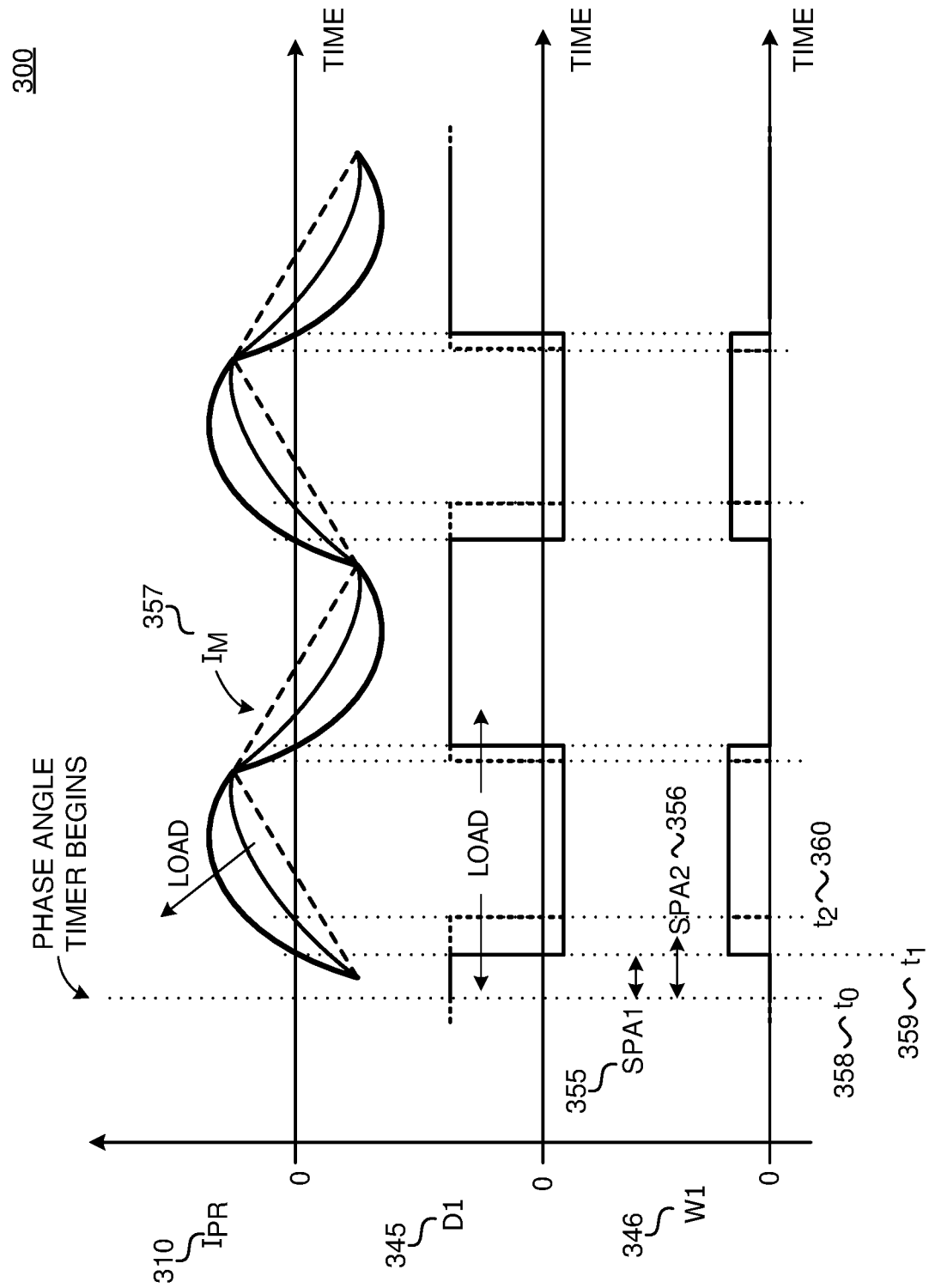
FIG. 3 illustrates a timing diagram with example waveforms for the primary current, winding signal and winding clock signal in accordance with the teachings of the present invention.

FIG. 3 is a timing diagram 300 with example waveforms for the primary current $I_{PR}$ 310, first winding signal D1 345, and first winding clock W1 346, and how these signals may vary with load. It should be appreciated that similarly named and numbered elements couple and function as described above. The primary current $I_{PR}$ 310 is shown as an oscillating waveform, the dashed line illustrates an example magnetizing current $I_M$ 357, which is a portion of the primary current $I_{PR}$ 310. The dark solid line corresponds to a primary current $I_{PR}$ 310 with a larger load than the thin solid line. The magnetizing current $I_M$ 357 is illustrated as a sawtooth waveform. As the load increases, the magnitude of the primary current $I_{PR}$ 310 increases.

Winding signal D1 345 is a positive value when the output rectifier D1 is not conducting (and corresponds to two times the output voltage VO) and is a negative, near zero value when the output rectifier is conducting (corresponding to the diode conduction drop). The winding clock signal W1 346 is logic high when the output rectifier D1 is conducting (i.e., winding signal D1 345 is negative, near zero) and logic low when the output rectifier D1 is not conducting (i.e., winding signal D1 345 is positive). As the load increases, the conduction time of the output rectifier D1 increases, and as such the winding clock signal W1 346 is logic high for a longer duration of time.

For a larger load (thick solid line), the winding signal D1 345 may change polarities (corresponding to a zero crossing if the primary current $I_{FR}$ 310) at time t1 359. As such, winding clock W1 346 may transition from logic low to logic high at time t1 359. However, for a smaller load (thin solid line), the winding signal D1 345 may change polarities (corresponding to a zero crossing if the primary current IPR 310) at time t2 360 and the leading edge in winding clock W1 346 occurs.

Time t0 358 corresponds to the start of a phase angle timer. For the example shown, the phase angle is the duration between the start of the timer (time t0 358) and the leading edge of the winding clock W1 346. As shown, the sensed phase angle SPA1 355 for the larger load may be shorter than the sensed phase angle SPA2 356 for the smaller load. It should be appreciated that a similar characteristic can be seen with the second winding signal D2 and second winding clock W2 with regards to load.

Figure 4A:
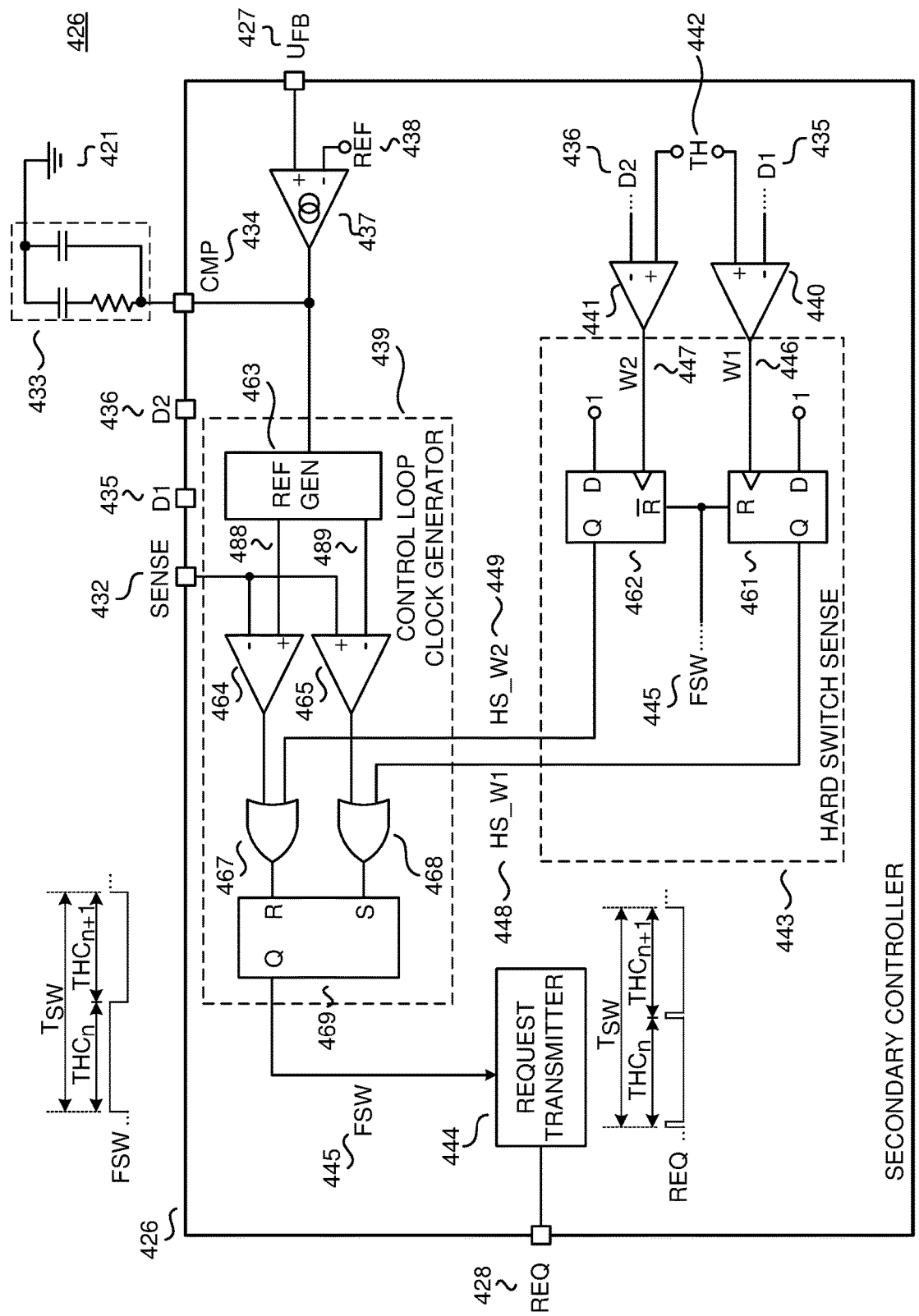
FIG. 4A is an example functional block diagram of the secondary controller with hard switch sense block of FIG. 1 in accordance with the teachings of the present invention.

FIG. 4A illustrates one example of a secondary controller 426 with hard switch sense block 443. Similarly named and numbered elements couple and function as described above. As shown, the secondary controller 426 includes a transconductance amplifier 437 (also referred to as a feedback reference circuit), control loop clock generator 439, comparators 440 and 441, hard switch sense block 443, and request transmitter 444. Transconductance amplifier 437 (i.e., feedback reference circuit) is coupled to receive the feedback signal $U_{FB}$ 427 and a feedback reference REF 438 and outputs the load signal CMP 434. The output of the transconductance amplifier 437 (i.e., feedback reference circuit) is coupled to a compensation circuit 433, which provides loop compensation for the feedback loop of the power converter. In one example, a larger value for the load signal CMP 434 corresponds to a smaller load. In other words, the load signal CMP 434 increases as the load decreases.

As shown in FIG. 4A, the control loop clock generator 439 includes a reference generator 463, comparators 464 and 465, OR gates 467 and 468, and latch 469. Reference generator 463 is coupled to receive the load signal CMP 434 and generate first 488 and second 489 references for comparators 464 and 465. The first reference 488 may substantially follow the value of the load signal CMP 434. The second reference 489 may be a complementary version of the first reference 488, whereby the magnitude of the first reference 488 above a common-mode value is equal and opposite for the second reference 489, with respect to the same common-mode value. Thus two references are created, one which substantially follows the load signal CMP 434 and the other with a complementary reference as described. The two references may move in opposite directions with respect to the load. The first reference 488 may generally reduce in value with increasing load. The second reference 489 (the complementary reference) may therefore generally increase in value with respect to increasing load.

Comparator 465 may be coupled to receive one of the second reference 489 from the reference generator 463 at its inverting input and the sense signal SENSE 432 at its non-inverting input. Comparator 464 may be coupled to receive the first reference 488 from the reference generator 463 at its non-inverting input and the sense signal SENSE 432 at its inverting input.

OR gate 468 is coupled to receive the output of comparator 465 and the hard switch sense signal HS_W1 448 from the hard switch sense block 443. OR gate 467 is coupled to receive the output of comparator 464 and the hard switch sense signal HS_W2 449 from hard switch sense block 443. Latch 469 is coupled to receive the outputs of OR gates 467 and 468. In the example shown, the latch 469 receives the output of OR gate 468 at its set S input and receives the output of OR gate 467 at its reset R input. The output of the latch 469 is the switching frequency signal FSW 445.

In operation for the example shown, the latch 469 is set, and the switching frequency signal FSW 445 transitions to a logic high value, when the sense signal SENSE 432 is greater than the second reference 489 provided by the reference generator 463 or hard switch sense signal HS_W1 is asserted. In other words, when a hard switch event has been detected from the first output winding, the current half cycle is terminated. The latch 469 is reset, and the switching frequency signal FSW 445 transitions to a logic low value, when the sense signal SENSE 432 falls below the first reference 488 provided by the reference generator 463 or the hard switch sense signal HS_W2 449 is asserted. In other words, when a hard switch event has been detected from the second output winding, the current half cycle is terminated. By varying the values of the references 488, 489 outputted by the reference generator 463 in response to the load signal CMP 434, the control loop clock generator 439 controls the switching frequency and switching period of the high side and low side switches and the amount of energy delivered to the output of the power converter. However, as will be further discussed, hard switch sense signal HS_W1 448 and HS_W2 449 may further modify the switching frequency and switching period of the high side and low side switches.

Each switching period $T_{SW}$ for the switching frequency signal FSW 445 includes two half cycles, shown as half cycle $THC_n$ and $THC_{n+1}$. The switching frequency signal FSW 445 is logic high during one of these half cycles ($THC_n$) and logic low during the other half cycle ($THC_{n+1}$). The switching period $T_{SW}$ and the lengths of the half cycles $THC_n$ and $THC_{n+1}$ are used to control the amount of energy delivered to the load. The longer the switching period $T_{SW}$ (i.e., the longer the half cycles $THC_n$ and $THC_{n+1}$), the more energy is delivered to the output of the power converter and the load. Under steady state conditions, the two half cycles $THC_n$ and $THC_{n+1}$ are substantially equal. However, under transient conditions the lengths of the two half cycles $THC_n$ and $THC_{n+1}$ are varied (and the overall switching period $T_{SW}$) to bring the output of the power converter into regulation.

As will be further discussed, the hard switch sense block 443 determines if the power converter may be hard switching by monitoring the first and second output windings. Both hard switch sense signal HS_W1 448 and HS_W2 449 may be pulsed signals that pulse to a logic high value when a hard switch event has been detected. The hard switch hard switch sense signal HS_W1 448 and HS_W2 449 may also clear at the end of the half cycle $THC_n$ or $THC_{n+1}$. However, it should be appreciated that other logic implementations of the hard switch sense block 443 are possible. In one example, hard switch sense signal HS_W1 448 pulses to a logic high value when a hard switch event has been detected on the first output winding, and hard switch sense signal HS_W2 pulses to a logic high value when a hard switch event has been detected on the second output winding. In response to the received pulses, the control loop clock generator 439 terminates the current half cycle ($THC_n$ or $THC_{n+1}$) via OR gates 467, 468, and latch 469 to change the state of the switching frequency signal FSW 445.

The switching frequency signal FSW 445 is received by the request transmitter 444 and the frequency of the request signal REQ 428 is responsive to the switching frequency and switching period set by the switching frequency signal FSW 445. In one example, a leading edge in the switching frequency FSW 445 corresponds to turning on the high side switch S1 while a trailing edge corresponds to turning on the low side switch S2. Comparator 440 is coupled to receive the first winding signal D1 435 and threshold TH 442 and outputs first winding clock W1 446. The first winding clock W1 446 is a rectangular pulse waveform with varying durations of logic high and logic low sections. In one example, threshold TH 442 is substantially near zero or below zero and the first winding clock W1 446 indicates the polarity of the first winding signal D1 435. Edges of the first winding clock W1 446 would represent a change in polarity of the first winding signal D1 435. In one example, a logic high value for first winding clock W1 446 corresponds to a negative polarity of the first winding signal D1 435 while a logic low value for first winding clock W1 446 corresponds to a positive polarity of the first winding signal D1 435. Stated in another way, the first winding clock W1 446 may be representative of the conduction of the output rectifier D1 coupled to the first output winding. For example, the first winding clock W1 446 may be logic high when the output rectifier D1 coupled to the first output winding is conducting and logic low when the output rectifier D1 is not conducting. As shown, the threshold TH 442 is received at the non-inverting input of comparator 440 while the first winding signal D1 435 is received at the inverting input.

Similarly, comparator 441 is coupled to receive the second winding signal D2 436 and threshold TH 442 and outputs the second winding clock W2 447. The second winding clock W2 447 is a rectangular pulse waveform with varying durations of logic high and logic low sections. In one example, threshold TH 442 is substantially near zero or below zero and the second winding clock W2 447 indicates the polarity of the second winding signal D2 436. Edges of the second winding clock W2 447 would represent a change in polarity of the second winding signal D2 436. In one example, a logic high value for second winding clock W2 447 corresponds to a negative polarity of the second winding signal D2 436 while a logic low value corresponds to a positive polarity of the second winding signal D2 436. Said in another way, the second winding clock W2 447 may be representative of the conduction of the output rectifier D2 coupled to the second output winding. For example, the second winding clock W2 447 may be logic high when output rectifier D2 is conducting and logic low when the output rectifier D2 is not conducting. As shown, the threshold TH 442 is received at the non-inverting input of comparator 441 while the second winding signal D2 436 is received at the inverting input. The change of polarity in the first and second winging signals D1 453 and D2 436 generally correspond with zero crossings of the primary current $I_{PR}$ of the power converter. As such, the first and second winging signals D1 453 and D2 436, along with the first and second winding clock signal W1 446 and W2 447 may be utilized to indirectly sense the primary current $I_{PR}$ of the power converter.

Hard switch sense block 443 is coupled to receive the switching frequency signal FSW 445, the first winding clock W1 446, and the second winding clock W2 447, and outputs hard switch sense signals HS_W1 448 and HS_W2 449. Hard switch sense signal HS_W1 448 is representative of detection of hard switching from the first output winding while hard switch sense signal HS_W2 449 is representative of detection of hard switching from the second output winding. When either signal HS_W1 448 or HS_W2 449 is asserted, the control loop clock generator 439 terminates the current half cycle by transitioning the switching frequency signal FSW 445 from logic high to logic low or vice versa.

As shown, the hard switch sense block 443 include flip-flop 461 and flip-flop 462. Flip-flop 461 is coupled to receive the first winding clock signal W1 446 at its clock input, a logic high value at its data D input (as indicated by the "1" in FIG. 4A), and the switching frequency signal FSW 445 at its reset R input. The output of flip-flop 462 is the hard switch sense signal HS_W1 448. Flip-flop 462 is coupled to receive the second winding signal W2 447 at its clock input, a logic high value at its data D input (as indicated by the "1" in FIG. 4A), and the switching frequency single FSW 445 at its inverse reset R input. The inverse reset for flip-flop 462 is indicated with the "bar" above the R in FIG. 4A. In operation, flip-flop 462 resets when the switching frequency signal FSW 445 is logic low, while flip-flop 461 resets when the switching frequency signal FSW 445 is logic high. The output of flip-flop 462 is the hard switch sense signal HS_W2 449. It should be appreciated that latches or other memory units which can remember previous states could also be used. In one example, the flip-flops could be considered a 1-bit memory unit.

In operation, the hard switch sense block 443 determines if there have been hard switch events by comparing the timing of the edges of winding clocks W1 446 and W2 447 to the value of the switching frequency signal FSW 445. In one implementation, flip-flops 461 and 462 capture the hard switch event. Under most normal conditions, a leading edge in the second winding clock W2 447 should not occur while the switching frequency signal FSW 445 is logic high. If a leading edge in the second winding clock W2 447 occurs while the switching frequency signal FSW 445 is logic high, the hard switch sense block 443 outputs a pulse in single HS_W2 449 to terminate the current half cycle and transition the switching frequency signal FSW 445 to a logic low value, which then initiates the turn OFF of the high side switch S1 and the turn ON of the low side switch S2. As shown, the flip-flop 462 outputs the logic high value (at its data D input) when the second winding clock W2 447 transitions to a logic high value (i.e., leading edge) while the switching frequency signal FSW 445 is logic high. The received pulse in the signal HS_W2 449 resets the latch 469 and the switching frequency signal FSW 445 transitions to a logic low value. Once the switching frequency signal FSW 445 transitions to a logic low value (i.e., trailing edge), flip-flop 462 resets and the signal HS_W2 449 is logic low. The particular configuration of this example uses the FSW is the reference phase 445 signal which in this case represents a phase-angle of zero, with positive phase events occurring after FSW-edges and negative phase events occurring before FSW edges. It should be appreciated that in another example the reference signal could be a non-zero reference phase angle.

Similarly, a leading edge in the first winding clock W1 446 should not occur while the switching frequency signal FSW 445 is logic low under most normal conditions. If a leading edge in the first winding clock W1 446 occurs while the switching frequency signal FSW 445 is logic low, the hard switch sense block 443 outputs a pulse in single HS_W1 448 to terminate the current half cycle and transition the switching frequency signal FSW 445 to a logic high value, which then initiates the turn OFF of the low side switch S2 and the turn ON of the high side switch S1. As shown, the flip-flop 461 outputs the logic high value (at its data D input) when the first winding clock W1 446 transitions to a logic high value (i.e., leading edge) while the switching frequency signal FSW 445 is logic low. The received pulse in signal HS_W1 448 sets the latch 469 and the switching frequency signal FSW 445 transitions to a logic high value. Once the switching frequency signal FSW 445 transitions to a logic high value (i.e., leading edge), flip-flop 461 resets and the signal HS_W1 448 is logic low. As such, the hard switch sense block 443 monitors the polarity change in the secondary windings to indirectly sense hard switch events.

Figure 4B:
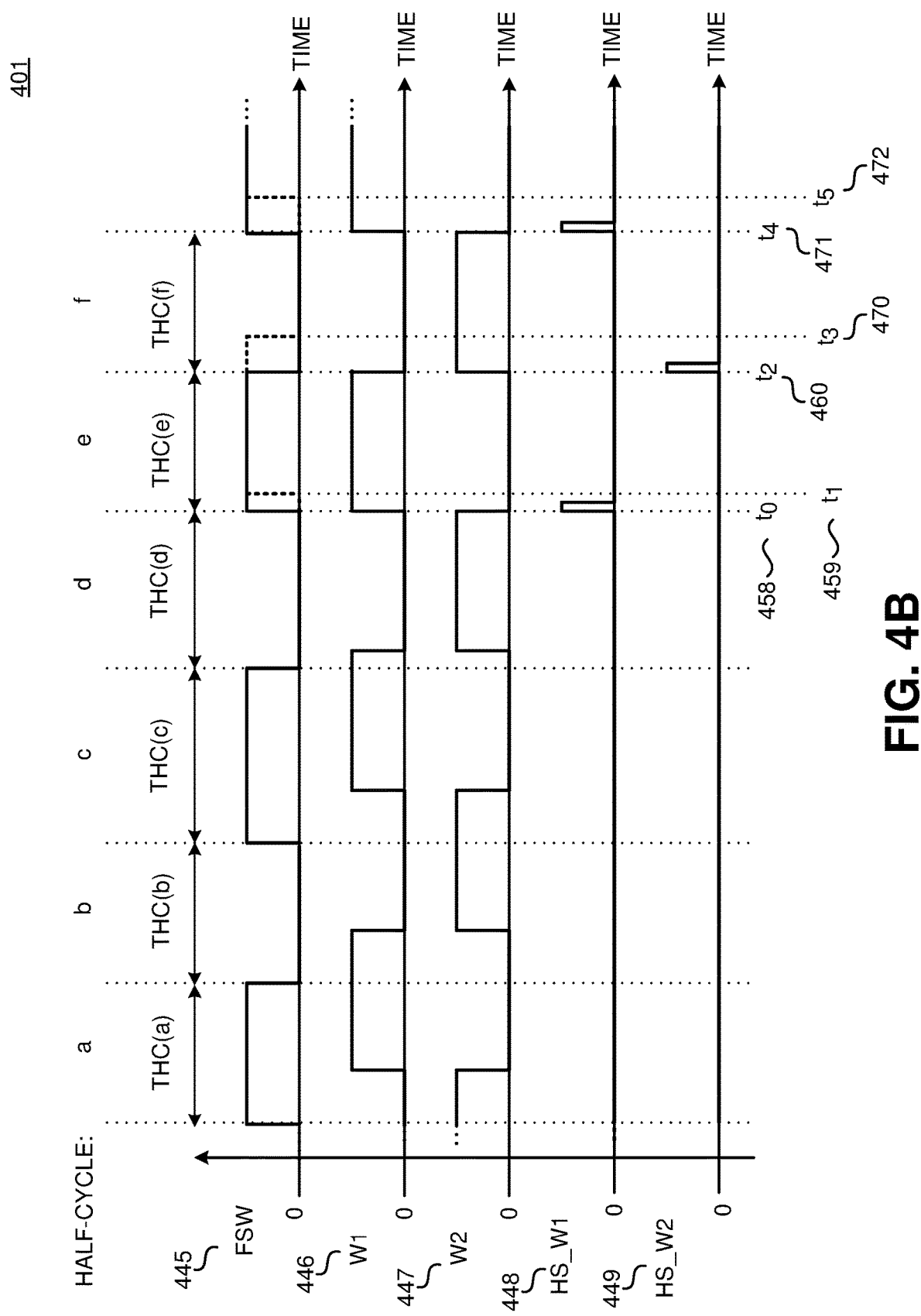
FIG. 4B is a timing diagram illustrating the implementation of the hard switch sense block of FIG. 4A in accordance with the teachings of the present invention.

FIG. 4B illustrates a timing diagram 401 of example waveforms of the switching frequency signal FSW 445, first winding clock signal W1 446, second winding clock signal w2 447, and hard switch sense signals HS_W1 448 and HS_W2 449. It should be appreciated that similarly named and numbered elements couple and function as described above. As shown, the switching frequency signal FSW 445 is a rectangular pulse waveform.

During half cycle a, the switching frequency signal FSW 445 is logic high. The duration of half cycle a is illustrated as THC(a). At the beginning of half cycle a, the first winding clock signal W1 446 is logic low while the second winding signal W2 447 is logic high. At some point during half cycle a, the first winding clock signal W1 446 transitions to a logic high value while the second winding signal W2 447 transitions to a logic low value. A leading edge in the second winding signal W2 447 does not occur while switching frequency signal FSW 445 is logic high. As such, there is no pulse in the hard switch sense signal HS_W2 449 during half cycle a.

For half cycle b, the switching frequency signal FSW 445 is logic how and the duration of half cycle b is illustrated as THC(b). As shown, the duration of half cycle a, THC(a), is substantially equal to the duration of half cycle b, THC(b). At the beginning of half cycle b, the first winding clock signal W1 446 is logic high while the second winding signal W2 447 is logic low. At some point during half cycle b, the first winding clock signal W1 446 transitions to a logic low value while the second winding signal W2 447 transitions to a logic high value. A leading edge in the first winding signal W1 447 does not occur while switching frequency signal FSW 445 is logic low. As such there is no pulse in hard switch sense signal HS_W1 448 during half cycle b.

For half cycle c, the switching frequency signal FSW 445 is logic high and the duration of half cycle c is illustrated as THC(c). In this example, the control loop clock generator 439 increased the switching period TSW of the switching frequency signal FSW 445 and THC(c) is greater than THC(b) and THC(a). At the beginning of half cycle c, the first winding clock signal W1 446 is logic low while the second winding signal W2 447 is logic high. At some point during half cycle c, the first winding clock signal W1 446 transitions to a logic high value while the second winding signal W2 447 transitions to a logic low value. Similar to half cycle a, a leading edge in the second winding signal W2 447 does not occur while switching frequency signal FSW 445 is logic high. As such, there is no pulse in the hard switch sense signal HS_W2 449 during half cycle c. For half cycles a, b, and c, it is the control loop clock generator 439 which determines when the switching frequency signal FSW 445 should transition between logic high and low values. However, the edges for the first winding signal W1 446 and second winding signal W2 447 are occurring closer to the beginning of half cycle c as compared to either half cycle a or half cycle b. This may indicate that the power converter is starting to operate near the borders of hard switching.

At the beginning of half cycle d, the switching frequency signal FSW 445 is logic low and the first winding clock signal W1 446 is logic high while the second winding signal W2 447 is logic low. At some point during half cycle d, the first winding clock signal W1 446 transitions to a logic low value while the second winding signal W2 447 transitions to a logic high value. However at time t0 458, the first winding clock signal W1 446 transitions back to a logic high value and the second winding signal W2 transitions to a logic low value. A leading edge in the first winding clock signal W1 446 occurs while the switching frequency signal FSW 445 is logic low. As such, the hard switch sense signal HS_W1 448 pulses to a logic high value a time t0 458 and the switching frequency signal FSW 445 transitions to a logic high value. The duration of half cycle d is shown as THC(d) and ends at time t0 458. The dashed leading edge in the switching frequency signal FSW 445 at time tl 459 indicates where the switching frequency signal FSW 445 would have transitioned to a logic high value if the hard switch event was not detected.

At the beginning of half cycle e, the switching frequency signal FSW 445 is logic high and the first winding clock signal W1 446 is logic high while the second winding signal W2 447 is logic low. At time t2 460, the first winding clock signal W1 446 transitions to a logic low value while the second winding signal W2 447 transitions to a logic high value. A leading edge in the second winding clock signal W2 447 occurs while the switching frequency signal FSW 445 is logic high. As such, the hard switch sense signal HS_W2 449 pulses to a logic high value at time t2 460 and the switching frequency signal FSW 445 transitions to a logic low value. The duration of half cycle e is shown as THC(e) and ends at time t2 460. The dashed trailing edge in the switching frequency signal FSW 445 at time t3 470 indicates where the switching frequency signal FSW 445 would have transitioned to a logic low value if the hard switch event was not detected.

At the beginning of half cycle f, the switching frequency signal FSW 445 is logic low and the first winding clock W1 446 is logic low while the second winding clock W2 447 is logic high. At time t4 471, the first winding clock W1 446 transitions to a logic high value while the second winding clock W2 447 transitions to a logic low value. A leading edge in the first winding clock signal W1 446 occurs while the switching frequency signal FSW 445 is logic low. As such, the hard switch sense signal HS_W1 448 pulses to a logic high value a time t4 471 and the switching frequency signal FSW 445 transitions to a logic high value. The duration of half cycle f is shown as THC(f) and ends at time t4 471. The dashed leading edge in the switching frequency signal FSW 445 at time t5 472 indicates where the switching frequency signal FSW 445 would have transitioned to a logic high value if the hard switch event was not detected.

Figure 5:
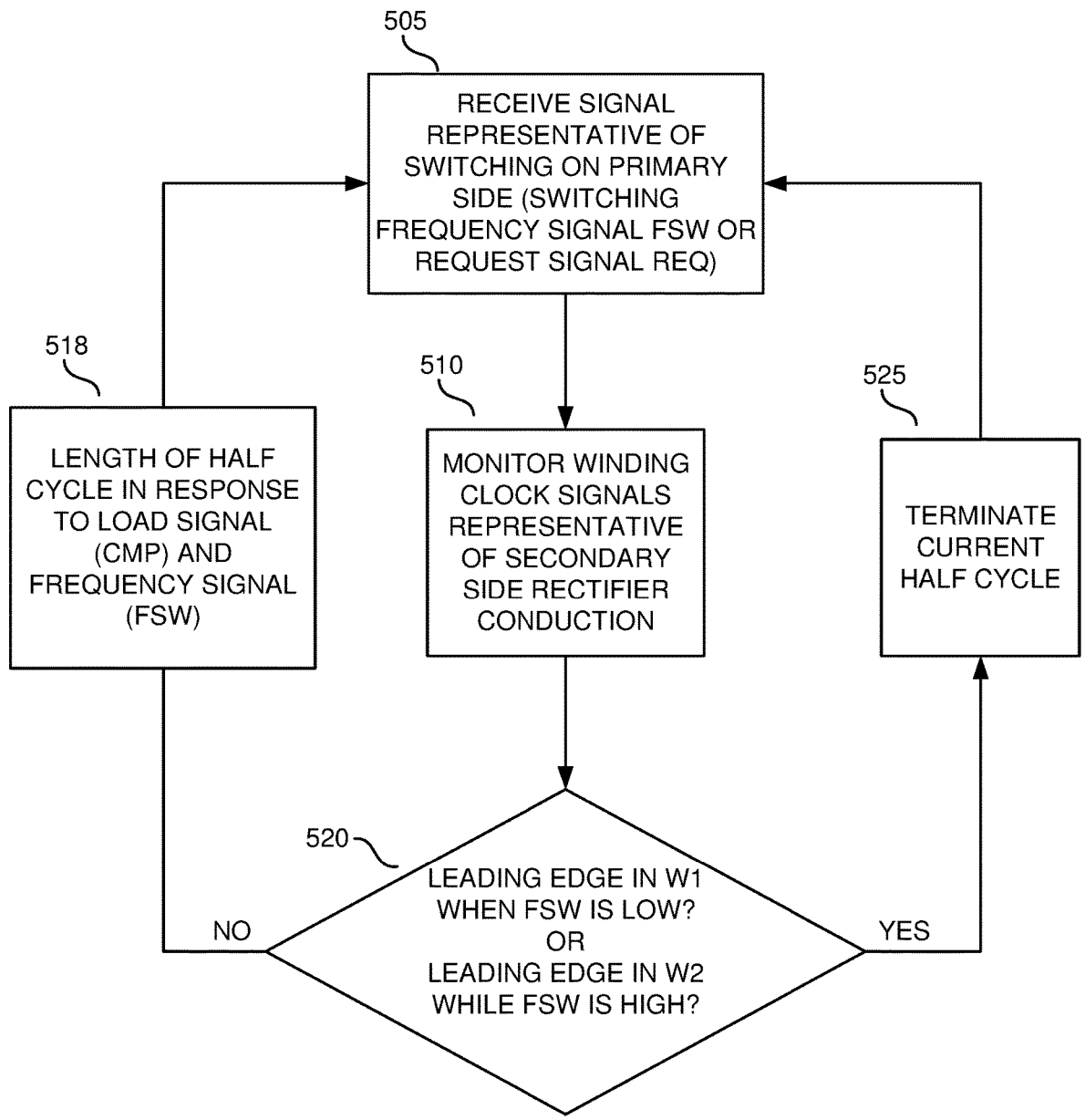
FIG. 5 is a flow diagram representing the function of the secondary controller hard switch sense of FIGS. 4A and 4B in accordance with the teachings of the present invention.

FIG. 5 illustrates a flow diagram 505 representing the function of the secondary controller with hard switch sense blocks of FIGS. 1, 4A, and 4B. At block 505, a signal representative of switching on the primary side is received. In other words, the signal is also representative of the switching of the high side switch S1 and the low side switch S2. This signal may be the switching frequency signal FSW or the request signal REQ.

At block 510, the hard switch sense block monitors the winding clock signals representative of secondary side rectifier conduction. Stated differently, the hard switch sense block also monitors the polarity changes in the output windings.

At block 520, the hard switch sense block determines if a leading edge in the first winding clock W1 is received when the low side switch S2 is conducting (i.e., the switching frequency signal FSW is logic low) or a leading edge in the second winding clock W2 is received when the high side switch S1 is conducting (i.e., the switching frequency signal FSW is logic high). If yes, the current half cycle is terminated in block 525. If no, the length of the half cycle is responsive to the load signal CMP and the switching frequency signal FSW in block 518.

Figure 6:
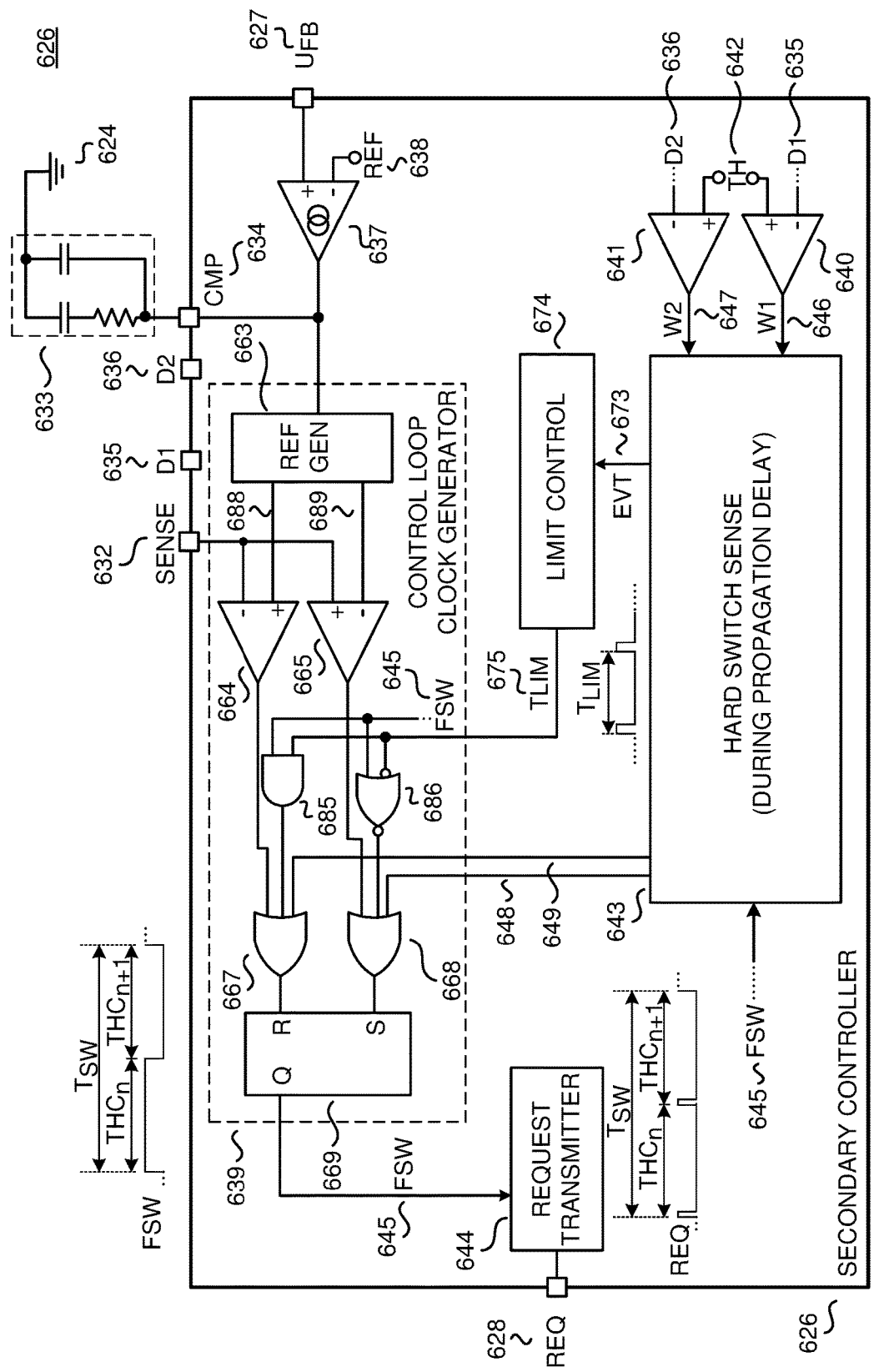
FIG. 6 is an example functional block diagram of the secondary controller with hard switch sense block and a limit control in accordance with the teachings of the present invention.

FIG. 6 illustrates another example of a secondary controller 626 with hard switch sense block 643. It is appreciated that secondary controller 626 shares many similarities with the example secondary controllers 126 and 426 of FIGS. 1, 4A, and 4B, and that similarly named and numbered elements couple and function as described above. In the example of FIG. 6, the hard switch sense block 643 also includes hard switch sensing during the propagation delay of the power converter. Further, the secondary controller 626 includes limit control block 674.

Similar to the previous figures, the hard switch sense block 643 is coupled to receive the switching frequency signal FSW 645, the first winding clock W1 646, and the second winding clock W2 647, and outputs hard switch sense signals HS_W1 648 and HS_W2 649. Hard switch sense signal HS_W1 648 is representative of detection of hard switching from the first output winding while hard switch sense signal HS_W2 649 is representative of detection of hard switching from the second output winding. When either signal HS_W1 648 or HS_W2 649 is asserted, the control loop clock generator 4639 ends the current half cycle by transitioning the switching frequency signal FSW 645 from logic high to logic low or vice versa.

The hard switch sense block 643 also outputs event signal EVT 673, which is representative of detection of a hard switch event during the propagation delay of the power converter. In one example, the event signal EVT 673 is a pulsed waveform that pulses to a logic high value when a hard switch event during propagation delay has been detected. As mentioned above with respect to FIGS. 2A and 2B, there is generally a delay between the sending of pulses in the request signal REQ 628 (responsive to the edges of the switching frequency signal FSW 645) and actual turn OFF, dead time, and then turn ON of the high side switch S1 and low side switch S2 due to delays in transmission and/or internal circuits. This delay is represented by propagation delay TPD. The secondary controller 626 via the hard switch sense block 643 can determine if hard switching occurs by monitoring the change in polarity of the first and second output windings (i.e., monitoring the conduction of the output rectifiers) with respect to the switching frequency signal FSW 645 during the propagation delay TPD. It should be appreciated also that the propagation delay TPD could be used as an arbitrary reference phase angle for the hard-switch phase-comparator 643.

Each switching period $T_{SW}$ for the switching frequency signal FSW 645 includes two half cycles, shown as half cycle $THC_n$ and $THC_{n+1}$. The switching frequency signal FSW 645 is logic high during one of these half cycles ($THC_n$) and logic low during the other half cycle ($THC_{n+1}$). The switching period $T_{SW}$ and the lengths of the half cycles $THC_n$ and $THC_{n+1}$ are used to control the amount of energy delivered to the load. The longer the switching period $T_{SW}$ (i.e., the longer the half cycles $THC_n$ and $THC_{n+1}$), the more energy is delivered to the output of the power converter and the load. Under steady state conditions, the two half cycles $THC_n$ and $THC_{n+1}$ are substantially equal. However, under transient conditions the lengths of the two half cycles $THC_n$ and $THC_{n+1}$ are varied (and the overall switching period $T_{SW}$) to bring the output of the power converter into regulation.

Limit control 674 is coupled to receive the event signal EVT 673 and outputs a limit signal 675 representative of the maximum duration of a half cycle in response to the detection of hard switch events. When a hard switch event is detected by the hard switch sense block 643, the limit control block 674 shortens the duration of the next half cycle. The amount which the next half cycle is shortened can be a fixed or variable value. When variable, the limit control block 674 can shorten the next half cycle by the time between sending a request signal REQ 628 and the detection of the hard switch event. In other words, the next half cycle can be shortened by the time between a pulse in the request signal REQ 628 and a pulse in the event signal EVT 673. As such, the limit control block 674 can potentially prevent hard switch events from occurring in subsequent half cycles.

Control loop clock generator 639 is coupled to receive the limit signal TLIM 675. Similar to previous examples of the control loop clock generator in previous figures, control loop clock generator 639 includes reference generator 663, comparators 664 and 665, OR gates 667 and 668, and latch 669. It should be appreciated that similarly named and numbered elements couple and function as described above. The control loop clock generator 639 illustrated in FIG. 6 also includes AND gate 685 and NOR gate 686. AND gate 685 is coupled to receive the switching frequency signal FSW 645 and the limit signal TLIM 675. The output of AND gate 685 is received by OR gate 667. NOR gate 686 is coupled to receive the switching frequency signal FSW 645 and the inverted limit signal TLIM 675 (as indicated by the small circle at the input of NOR gate 686). The output of NOR gate 686 is received by OR gate 668. In operation, the latch 669 is set when the limit signal TLIM 675 is asserted while the switching frequency 645 is logic low (i.e., the half cycle limit as determined by the limit control 674 has been reached). Once the latch 669 is set, the switching frequency signal FSW 645 transitions to a logic high value. The latch 669 is reset when the limit signal TLIM 675 is asserted while the switching frequency signal FSW 645 is logic high (i.e., the half cycle limit as determined by the limit control 674 has been reached). Once the latch 669 is reset, the switching frequency signal FSW 645 transitions to a logic low value. By shortening the lengths of the half cycles, the limit control 674 and the control loop clock generator 639 reduce the amount of energy delivered to the output of the power converter in response to the detection of hard switch events by the hard switch sense block 643. As such, the limit control 674 in secondary controller 626 can potentially help prevent hard switch events from occurring in subsequent half cycles.

Figure 7A:
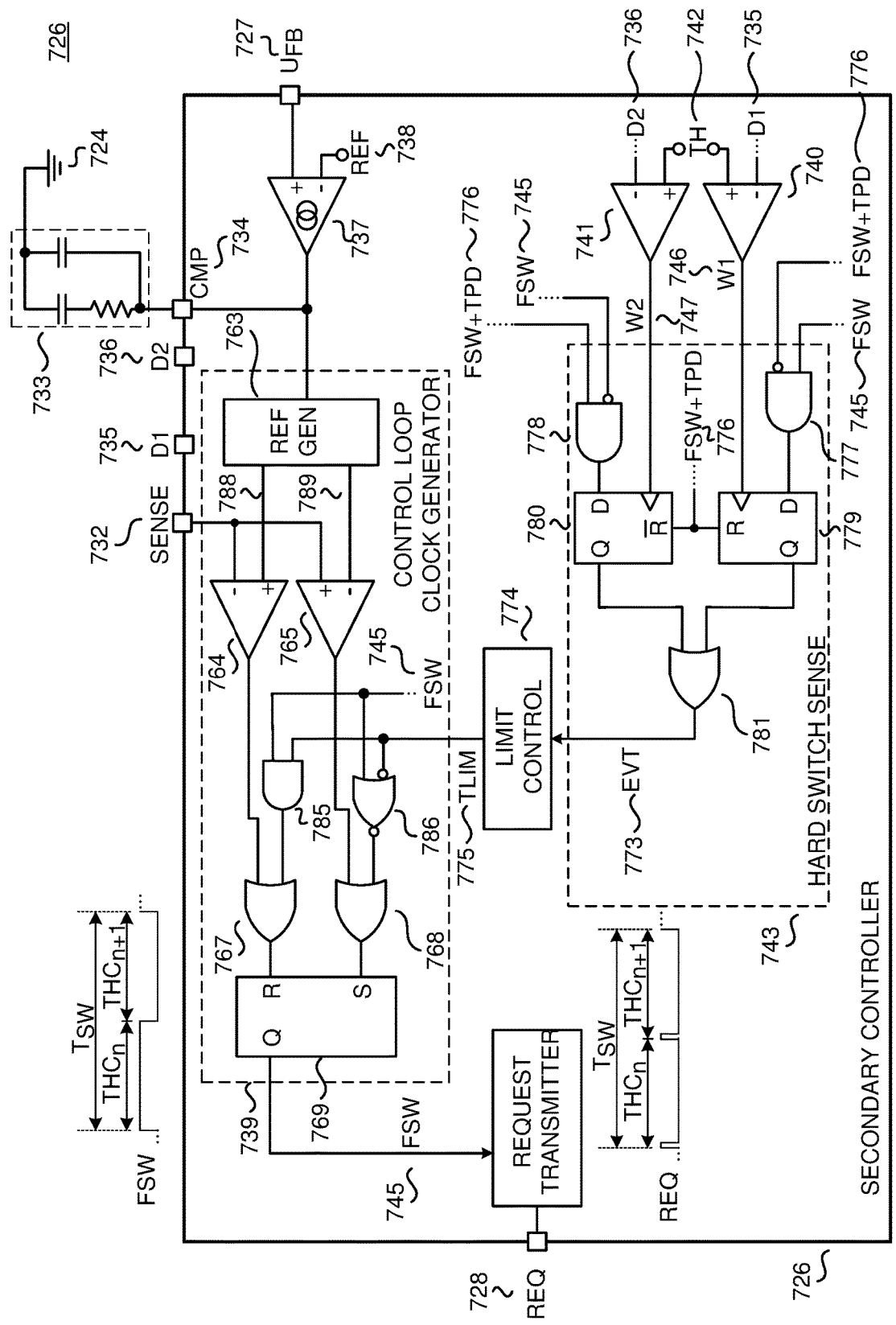
FIG. 7A is an example functional block diagram of the secondary controller with hard switch sense block and limit control of FIG. 6 in accordance with the teachings of the present invention.

FIG. 7A illustrates an example secondary controller 726 with hard switch sense block 743 and limit control block 774. It is appreciated that the secondary controller 767 shares many similarities with the example secondary controller 626 of FIG. 6, and that similarly named and numbered elements are coupled and function as described above. Further, some elements are not shown explicitly (such as for instance the hard switch sense signals HS_W1 and HS_W2 to simplify the figure).

As shown, FIG. 7A illustrates an example hard switch sense block 743 for sensing hard switch events during the propagation delay TPD of the power converter. Other circuit implementations are possible to detect the hard switch events during the propagation delay TPD. The hard switch sense block 743 includes AND gates 777, 778, flip-flops 779, 780, and OR gate 781. It should be appreciated that the elements of the hard switch sense block 743 shown in FIG. 7A can be used with the elements of the hard switch sense block shown in FIG. 4A. The hard switch sense block 743 is coupled to receive the switching frequency signal FSW 745, first and second winding clock signals W1 746 and W2 746, and delayed switching frequency signal FSW+TPD 776. The delayed switching frequency signal FSW+TPD 776 is the switching frequency signal FSW 745 delayed by the propagation delay TPD of the primary and secondary controller. Propagation delay TPD may be measured by the secondary controller or the secondary controller may assume a fixed propagation delay. In one example, propagation delay may be measured at startup. In another example, propagation delay may be measured by counting or timing the time between a request pulse 728 and a leading edge in either winding clock W1 746 or W2 747. The time measured between a request pulse 728 and a leading edge in either winding clock W1 746 or W2 747 could be averaged over several switching cycles. In a further example, the secondary controller 426 may monitor the sense signal 432 which includes information regarding the voltage at the half bridge HB node and the power delivery. The beginning of the slew of the voltage at the half bridge node can be seen in the sense signal 432 and a winding clock that occurs before the slew could indicate hard switching. Hard switch sense block 743 outputs the event signal EVT 773 representative of detected hard switch events during the propagation delay TPD.

By monitoring the first and second output windings (and ergo the conduction of the output rectifiers) during the propagation delay TPD with respect to the switching frequency FSW 745, the hard switch sense block 743 determines if the power converter may be hard switching. As mentioned above, the event signal EVT 773 may be a pulsed signal which pulses to a logic high value when a hard switch event has been detected.

As shown, AND gate 777 is coupled to receive the switching frequency signal FSW 745 and the inverted delayed switching frequency signal FSW+TPD 776, as shown by the small circle at the input of AND gate 777. The output of AND gate 777 is received at the data D input of flip-flop 779 and is logic high for the propagation delay TPD after a leading edge in the switching frequency signal FSW 745.

Similarly, AND gate 778 is coupled to receive the inverted switching frequency signal FSW 745, as shown by the small circle at the input of AND gate 778, and the delayed switching frequency signal FSW+TPD 776. The output of AND gate 778 is received at the data D input of flip-flop 780 and is logic high for the propagation delay TPD after a trailing edge in the switching frequency signal FSW 745.

Flip-flop 779 is coupled to receive the first winding clock signal W1 at its clock input, the output of AND gate 777 at its data D input, and the delayed switching frequency signal FSW+TPD 776 at its reset R input. The output of flip-flop 779 is received by OR gate 781. Flip-flop 780 is coupled to receive the second winding clock signal W2 747 at its clock input, the output of AND gate 778 at its data D input, and the delayed switching frequency signal FSW+TPD 776 at its inverse reset 11 input. The inverse reset for flip-flop 780 is indicated with the "bar" above the R in FIG. 7A. In operation, flip-flop 780 is reset when the delayed switching frequency signal FSW+TPD 776 is logic low, while flip-flop 779 is reset when the delayed switching frequency signal FSW+TPD 776 is logic high. It should be appreciated that latches or other memory units which can remember previous states could also be used. In one example, the flip-flops could be considered a 1-bit memory unit.

In operation, the hard switch sense block 743 determines if there have been hard switch events by comparing the timing of the edges of winding clocks W1 746 and W2 747 during the propagation delay TPD after each leading and trailing edge of the switching frequency signal FSW 745 by utilizing flip-flops 779 and 780, and AND gates 777 and 778. Under most normal conditions (ZVS), a leading edge in the second winding clock W2 747 should not occur during the propagation delay TPD after a trailing edge in the switching frequency signal FSW 745. If a leading edge in the second winding clock W2 747 occurs during the propagation delay TPD after a trailing edge in the switching frequency signal FSW 745, the flip-flop 780 outputs a logic high value and the event signal 773 transitions to a logic high value. The flip-flop 780 remains logic high (and ergo the event signal 773) until the propagation delay TPD after the trailing edge in the switching frequency signal FSW 745 has passed. After the trailing edge propagation delay TPD, the flip-flop 780 is reset and the event signal 773 transitions to a logic low value. As mentioned above, while the request signal REQ sends a pulse at every edge of the switching frequency signal FSW 745, the high side switch S1 or low side switch S2 may not switch immediately due to delays in transmission and/or internal circuits. This delay is represented by propagation delay TPD 752.

Similarly, a leading edge in the first winding clock W1 746 should not occur during the propagation delay TPD after a leading edge in the switching frequency signal FSW. If a leading edge in the first winding clock W1 746 occurs during the propagation delay TPD after the leading edge in the switching frequency signal FSW, the flip-flop 779 outputs a logic high value and the event signal 773 transitions to a logic high value. The flip-flop 779 remains logic high (and ergo the event signal 773) until the propagation delay TPD after the leading edge in the switching frequency signal FSW 745 has passed. After the trailing edge propagation delay TPD, the flip-flop 779 is reset and the event signal 773 transitions to a logic low value. In response to a pulse in the event signal EVT 773, the limit control 774 shortens the length of the next half cycle or a plurality of consecutive half cycles.

Figure 7B:
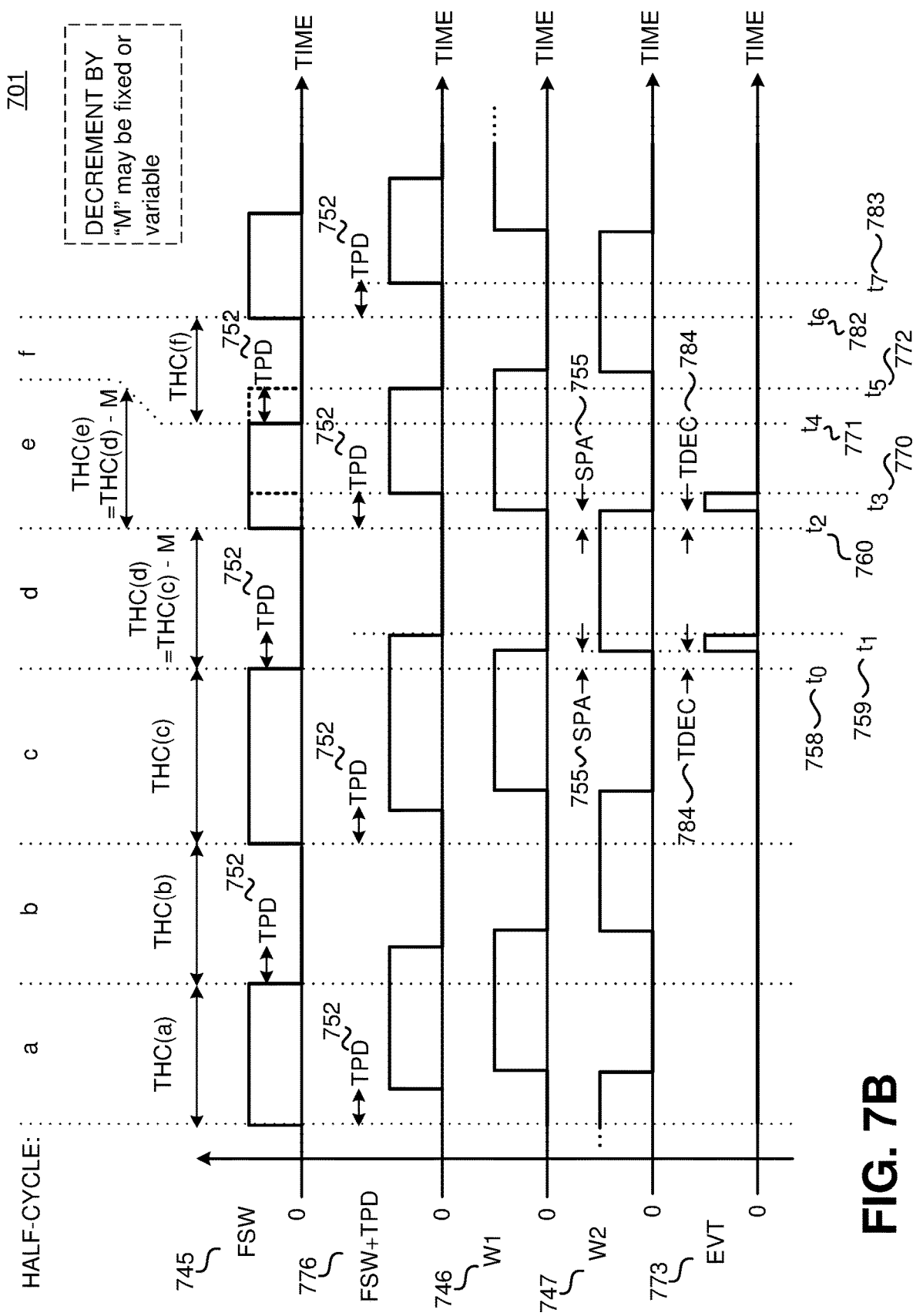
FIG. 7B is a timing diagram illustrating the implementation of the hard switch sense of FIG. 7A in accordance with the teachings of the present invention.

FIG. 7B illustrates a timing diagram 701 of example waveforms of the switching frequency signal FSW 745, delayed switching frequency signal FSW+TPD 776, first winding clock signal W1 746, second winding clock signal W2 747, and event signal EVT 773. It should be appreciated that similarly named and numbered elements are coupled and function as described above. As shown, the switching frequency signal FSW 745 is a rectangular pulse waveform and the delayed switching frequency signal FSW+TPD 776 is substantially the switching frequency signal FSW 745 delayed by the propagation delay TPD 752.

During half cycle a, the switching frequency signal FSW 745 is logic high. The duration of half cycle a is illustrated as THC(a). At the beginning of half cycle a, the first winding clock signal W1 746 is logic low while the second winding signal W2 747 is logic high. At some point during half cycle a, the first winding clock signal W1 746 transitions to a logic high value while the second winding signal W2 747 transitions to a logic low value. A leading edge in the first winding signal W1 746 does not occur during the propagation delay TPD 752 after the leading edge of the switching frequency signal FSW 745. As such, there is no pulse in the event signal EVT 773 during half cycle a.

For half cycle b, the switching frequency signal FSW 745 is logic how and the duration of half cycle b is illustrated as THC(b). At the beginning of half cycle b, the first winding clock signal W1 746 is logic high while the second winding signal W2 747 is logic low. At some point during half cycle b, the first winding clock signal W1 746 transitions to a logic low value while the second winding signal W2 447 transitions to a logic high value. A leading edge in the second winding signal W2 747 does not occur during the propagation delay TPD 752 after the trailing edge of the switching frequency signal FSW 745. As such there is no pulse in the event signal EVT 773 during half cycle b.

For half cycle c, the switching frequency signal FSW 745 is logic high and the duration of half cycle c is illustrated as THC(c). In this example, the control loop clock generator 739 increased the switching period TSW of the switching frequency signal FSW 745 and THC(c) is greater than THC(b) and THC(a). At the beginning of half cycle c, the first winding clock signal W1 446 is logic low while the second winding signal W2 747 is logic high. At some point during half cycle c, the first winding clock signal W1 746 transitions to a logic high value while the second winding signal W2 747 transitions to a logic low value. Similar to half cycle a, a leading edge in the first winding signal W1 746 does not occur during the propagation delay TPD 752 after the leading edge of the switching frequency signal FSW 745 and there is no pulse in the event signal EVT 773 during half cycle c. For half cycles a, b, and c, it is the control loop clock generator 739 (via the sense signal SENSE 732 and load signal CMP 734) that determines when the switching frequency signal FSW 745 should transition between logic high and low values.

At the beginning of half cycle d, the switching frequency signal FSW 745 is logic low and the first winding clock signal W1 746 is logic high while the second winding signal W2 747 is logic low. During the propagation delay TPD 752 after the trailing edge of the switching frequency signal FSW 745 (between time t0 758 and t1 759), the first winding clock signal W1 746 transitions to a logic low value while the second winding signal W2 747 transitions to a logic high value. As shown in FIG. 7B, the leading edge of second winding signal W2 747 occurs during the propagation delay TPD 752. As such, the event signal EVT 773 pulses to a logic high value and back to a logic low value at the end of the propagation delay TPD 752 at time t1 759. The sensed phase angle SPA 755 may be the time from the trailing edge of the switching frequency FSW 745 and leading edge in the second winding clock W2 747. Further, a decrement period TDEC 784 may be measured as the time between the trailing edge or leading edge of the switching frequency signal FSW 745 and the pulse in the event signal EVT 773.

In response to the pulse in the event signal EVT 773, the duration of the next half cycle or a plurality of consecutive or non-consecutive half cycles may be decremented by a value M. The value M may be a fixed or variable. In one example, the decrement value M may be the propagation delay TPD 752. In another example, the decrement value M may be the measured decrement period TDEC 784. In the example shown, the limit for the duration of half cycle (d) is substantially the duration of half cycle c THC(c) minus the decrement value M, or mathematically: THC(d)=THC(c)−M. Although the hard switch event is sensed during half cycle d of the switching frequency signal FSW 745 and the duration of half cycle d THC(d) is decremented, the high side switch S1 and low side switch S2 are operating in half cycle c, as shown by the delayed switching frequency signal FSW+TPD 776 and as such it is the "next" half cycle which is decremented. In some implementations, more than one half cycle is shortened or decremented after detection of a single hard switching event, with each half cycle shortened by the decrement value M or a variable value. Half cycle d of the switching frequency signal FSW 745 ends at time t2 760 and the switching frequency signal FSW 745 transitions to a logic high value. The dashed leading edge at time t3 770 is an example of where half cycle d would have ended if a hard switch event was not detected.

At the beginning of half cycle e, the switching frequency signal FSW 745 is logic high and first winding clock signal W1 746 is logic low while the second winding signal W2 747 is logic high. During the propagation delay TPD 752 after the leading edge of the switching frequency signal FSW 745 (between time t2 760 and t3 770), the first winding clock signal W1 446 transitions to a logic high value (i.e., leading edge). Since the leading edge of the first winding clock signal W1 occurs during the propagation delay TPD 752, the event signal EVT 773 pulses to a logic high value and back to a logic low value at the end of the propagation delay at time t3 770. The sensed phase angle SPA 755 may be the time from the leading edge of the switching frequency FSW 745 and leading edge in the first winding clock W1 746. Further, a decrement period TDEC 784 may be measured as the time between the trailing edge or leading edge of the switching frequency signal FSW 745 and the pulse in the event signal EVT 773.

In response to the pulse in the event signal EVT 773, the duration of the next half cycle or a plurality of consecutive or non-consecutive half cycles may be decremented by a value M. In the example shown, the limit for the duration of half cycle (e) is substantially the duration of half cycle d THC(d) minus the decrement value M, or mathematically: THC(e)=THC(d)−M. Although the hard switch event is sensed during half cycle e of the switching frequency signal FSW 745 and the duration of half cycle e THC(e) is decremented, the high side switch S1 and low side switch S2 are operating in half cycle d, as shown by the delayed switching frequency signal FSW+TPD 776 and as such it is the "next" half cycle which is decremented or a plurality of consecutive or non-consecutive half cycles. Half cycle e of the switching frequency signal FSW 745 ends at time t4 771 and the switching frequency signal FSW 745 transitions to a logic low value. The dashed leading edge at time t5 772 is an example of where half cycle e would have ended if a hard switch event was not detected. However, it should be appreciated that comparators 764 of 765 could trigger the latch 769 to reset or set prior to the pulse generated in the limit signal TLIM 775.

At the beginning of half cycle f, the switching frequency signal FSW 745 is logic low and the first winding clock signal W1 746 is logic high while the second winding signal W2 747 is logic low. As shown, there is no edge in either the first winding clock signal W1 746 or the second winding signal W2 747 during the propagation delay TPD 752 between time t4 771 and time t5 772. As such, no hard switching event is detected and the event signal EVT 773 remains logic low. For half cycle e, the control loop clock generator 739 (via the sense signal SENSE 732 and load signal CMP 734) determines when the switching frequency signal FSW 745 should transition between logic high and low values. Further, there is no edge in either the first winding clock signal W1 746 or the second winding signal W2 747 during the propagation delay TPD 752 between time t6 782 and time t7 783. No hard switching event is detected and the event signal EVT 773 still remains logic low. As shown in FIG. 7B, by reducing the lengths of the half cycles in response to sensed hard switching, the secondary controller may prevent hard switching in subsequent half cycles.

Figure 7C:
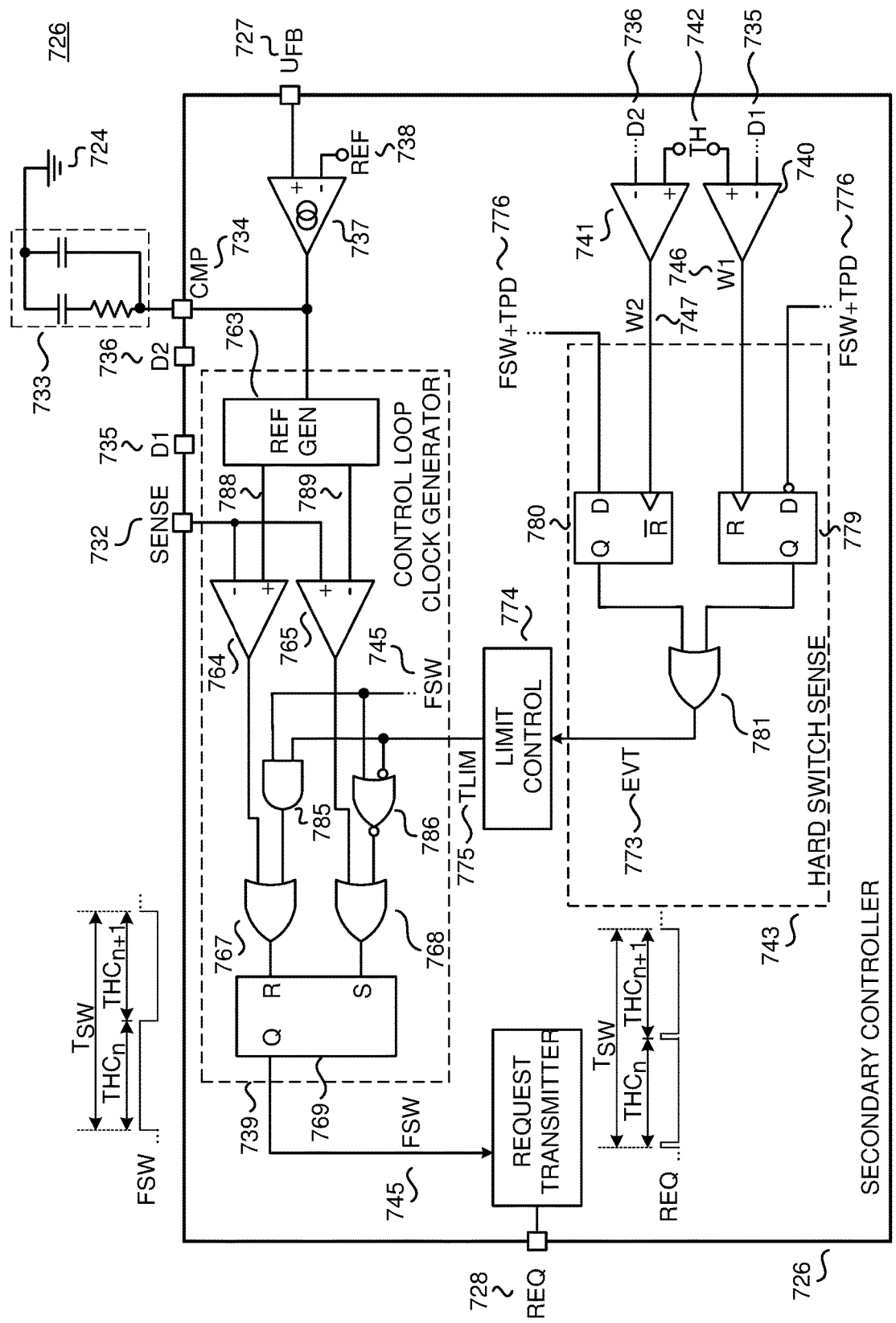
FIG. 7C is another example functional block diagram of the secondary controller with hard switch sense block and limit control of FIG. 6 in accordance with the teachings of the present invention.

FIG. 7C illustrates an example secondary controller 726 with hard switch sense block 743 and limit control block 774. It is appreciated that the secondary controller 767 shares many similarities with the example secondary controller 626 of FIG. 6 and secondary controller 726 of FIG. 7A, and that similarly named and numbered elements are coupled and function as described above. Further, some elements are not shown explicitly (such as for instance the hard switch sense signals HS_W1 and HS_W2 to simplify the figure). At least one difference from the secondary controller shown in FIG. 7A is the removal of AND gates 777, 778 and the reset signals into flip-flops 779, 780. As compared to FIG. 7A, the secondary controller 726 shown in FIG. 7B monitors the first and second output windings (and ergo the conduction of the output rectifiers) not just during the propagation delay TPD, but for the duration of the delayed switching signal FSW+TPD 776. Or worded differently, the hard switch sense block 743 determines if there have been hard switch events by comparing the timing of the edges of winding clocks W1 746 and W2 747 with the value of the delayed switching signal FSW+TPD 776.

In the example shown, flip-flop 779 is coupled to receive the inverted delayed switching frequency signal FSW+TPD 776 while flip-flop 780 is coupled to receive the delayed switching frequency signal FSW+TPD 776. In operation, the hard switch sense block 743 determines there is a hard switch event if a leading edge occurs in winding clock W1 746 while the delayed switching frequency signal FSW+TPD 776 is logic low (i.e., the inverted delayed switching frequency signal FSW+TPD 776 is logic high). Further, the hard switch sense block 743 determines there is a hard switch event if a leading edge occurs in winding clock W2 747 while the switching frequency signal FSW+TPD 776 is logic high. When a hard switch event is detected, the event signal EVT 773 would be asserted for a full cycle of the delayed switching frequency signal FSW+TPD 776.

Figure 8:
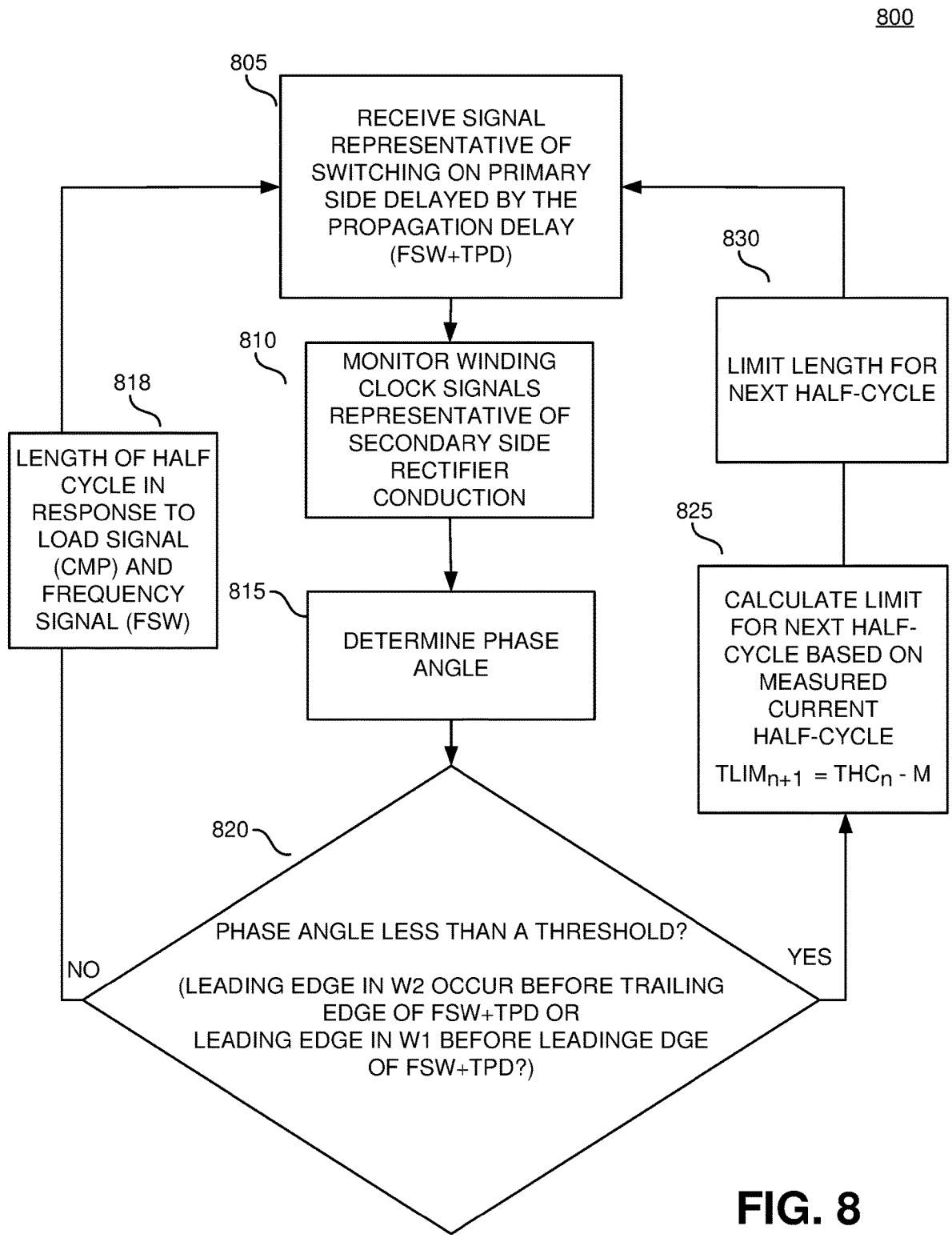
FIG. 8 is a flow diagram representing the function of the secondary controller hard switch sense of FIGS. 6 and 7A-7C in accordance with the teachings of the present invention.

FIG. 8 illustrates a flow diagram 800 representing the function of the secondary controller hard switch sense of FIGS. 6, 7A-7C in accordance with the teachings of the present invention. At block 805, a signal representative of switching on the primary side delayed by the propagation delay is received. In other words, the signal is also representative of the switching of the high side switch S1 and the low side switch S2 including the delay time to transmit from the secondary controller to the primary controller and the delays of the various circuits within both. This delayed signal may be the switching frequency signal plus the propagation delay FSW+TPD.

At block 810, the hard switch sense monitors the winding clock signals representative of secondary side rectifier conduction. Stated differently, the hard switch sense block also monitors the polarity changes in the output windings.

At block 815, the hard switch sense determines the phase angle for hard switching, which may be defined as the duration of time between either the high side switch S1 or low side switch S2 switching and the polarity changes in the output windings. Or in other words, the phase angle may be defined as the duration of time between the leading edges of either the first or second drive signal and the primary current $I_{PR}$ changing polarity (i.e., crossing zero). In one example, the secondary controller may know the values for the propagation delay TPD and dead time TZV and the sensed phase angle SPA can be defined as the duration of time between a pulse in the request signal REQ and the leading edge of winding clock signals W1 and W2 minus the propagation delay TPD and dead time TZV.

At block 820, the hard switch sense determines if the phase angle is less than a threshold. In one example the hard switch sense determines if a leading edge in the second winding clock W2 is received before a trailing edge of the FSW+TPD signal or if a leading edge in the first winding clock signal W1 is received before a leading edge of the FSW+TPD signal. If yes, the limit for the next half cycle is calculated based on the measured current half cycle minus a decrement value M (i.e., $TLIM_{n+1}=THC_n-M$) in block 825, and then the length of next half cycle is limited accordingly in block 830. If no, the length of the half cycle is responsive to the load signal CMP and the switching frequency signal FSW in block 818.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller configured for use in a power converter, the controller comprising:
   a control loop clock generator configured to generate a switching frequency signal in response to a sense signal representative of a characteristic of the power converter, the control loop clock generator further coupled to receive a load signal that is responsive to an output load of the power converter, the control loop clock generator further configured to terminate a switching of a half line cycle in response to a hard switch sense output;
   a hard switch sense circuit configured to generate the hard switch sense output in response to the switching frequency signal and a rectifier conduction signal representative of a polarity of an energy transfer element of the power converter, to determine if power converter switching losses occur due to hard switching; and
   a request transmitter circuit configured to generate a request signal in response to the switching frequency signal to control switching of a switching circuit coupled to an input of the energy transfer element of the power converter, wherein the request signal terminates the half line cycle in response to the hard switch sense output.

2. The controller of claim 1, wherein the sense signal is representative of at least one of an input voltage of the power converter, an output power of the power converter, an input power of the power converter, or a power processed by the power converter.

3. The controller of claim 1, further comprising a feedback reference circuit having a first input coupled to receive a feedback signal, a second input coupled to receive a feedback reference signal, and an output coupled to a compensation circuit, the compensation circuit configured to provide loop compensation for the feedback reference circuit, the output further coupled to an output return of the power converter, wherein the feedback reference circuit is configured to generate the load signal in response to the feedback signal, the feedback reference signal, and the compensation circuit.

4. The controller of claim 1,
   wherein the energy transfer element comprises a first output winding and a second output winding,
   wherein the hard switch sense circuit is configured to indicate a hard switch event in response to a first rectifier coupled to the first output winding transitioning from a non-conducting state to a conducting state when the switching frequency signal is in a first logic state, and
   wherein the hard switch sense circuit is further configured to indicate the hard switch event in response to a second rectifier coupled to the second output winding transitioning from the non-conducting state to the conducting state when the switching frequency signal is in a second logic state.

5. The controller of claim 1, wherein the hard switch sense circuit is configured to sense that a primary current of the power converter is substantially equal to zero or flowing in an opposite direction in response to changes in polarity of a voltage of the rectifier conduction signal.

6. The controller of claim 5,
wherein the rectifier conduction signal comprises a first winding signal and a second winding signal,
wherein the first winding signal is representative of conduction in a first rectifier coupled to a first output winding of the energy transfer element, and
wherein the second winding signal is representative of conduction in a second rectifier coupled to a second output winding of the energy transfer element.

7. The controller of claim 6,
wherein the hard switch sense circuit is configured to indicate a hard switch event in response to the first winding signal transitioning from a first state to a second state when the switching frequency signal is in a first logic state, and
wherein the hard switch sense circuit is further configured to indicate the hard switch event in response to the second winding signal transitioning from the first state to the second state when the switching frequency signal is in a second logic state.

8. The controller of claim 1, further comprising:
a first comparator configured to generate a first winding clock coupled to be received by the hard switch sense circuit in response to a winding threshold and a first winding signal coupled to be received from a first rectifier coupled to a first output winding of the energy transfer element; and
a second comparator configured to generate a second winding clock coupled to be received by the hard switch sense circuit in response to the winding threshold and a second winding signal coupled to be received from a second rectifier coupled to a second output winding of the energy transfer element.

9. The controller of claim 8, wherein the hard switch sense circuit comprises:
a first 1-bit memory unit coupled to be clocked in response to the first winding clock, wherein the first 1-bit memory unit is configured to be responsive to the switching frequency signal, wherein the first 1-bit memory unit is coupled further configured to output a first hard switch sense signal; and
a second 1-bit memory unit coupled to be clocked in response to the second winding clock, wherein the second 1-bit memory unit is configured to be responsive to the switching frequency signal, wherein the second 1-bit memory unit is configured to output a second hard switch sense signal.

10. The controller of claim 9, wherein the control loop clock generator comprises:
a reference generator configured to generate a first reference and a second reference in response to the load signal;
a third comparator configured to compare the first reference and the sense signal;
a fourth comparator configured to compare the second reference and the sense signal;
a first OR gate coupled to receive an output of the third comparator and the second hard switch sense signal;
a second OR gate coupled to receive an output of the fourth comparator and the first hard switch sense signal; and
a latch having a reset input coupled to an output of the first OR gate and a set input coupled to an output of the second OR gate, wherein the latch is configured to generate the switching frequency signal.

11. The controller of claim 10, the control loop clock generator further comprising:
a first AND gate coupled to receive the switching frequency signal and a limit signal from a limit control circuit, wherein the limit control circuit is configured to limit a maximum length of a half cycle of the switching frequency signal in response to an event signal from the hard switch sense circuit, wherein the first OR gate is further coupled to an output of the first AND gate; and
a NOR gate coupled to receive the switching frequency signal and an inverted limit signal from the limit control circuit, wherein the second OR gate is further coupled to an output of the NOR gate.

12. The controller of claim 9, the hard switch sense circuit further comprising:
a second AND gate coupled to receive the switching frequency signal and an inverted delayed switching frequency signal, wherein an output of the second AND gate is coupled to a data input of a first flip-flop, wherein the first flip-flop is configured to be responsive to a delayed switching frequency signal;
a third AND gate coupled to receive an inverted switching frequency signal and the delayed switching frequency signal, wherein an output of the third AND gate is coupled to a data input of a second flip-flop, wherein the second flip-flop is configured to be responsive to the delayed switching frequency signal; and
a third OR gate configured to generate an event signal in response to an output of the first flip-flop and an output of the second flip-flop.

13. The controller of claim 12, wherein the control loop clock generator comprises:
a reference generator configured to generate a first reference and a second reference in response to the load signal;
a third comparator configured to compare the first reference and the sense signal;
a fourth comparator configured to compare the second reference and the sense signal;
a first AND gate coupled to receive the switching frequency signal and a limit signal from a limit control circuit, wherein in the limit control circuit is configured to limit a maximum length of a half cycle of the switching frequency signal in response to the event signal from the hard switch sense circuit;
a NOR gate coupled to receive the switching frequency signal and an inverted limit signal from the limit control circuit;
a first OR gate coupled to receive an output of the third comparator and an output of the first AND gate;
a second OR gate coupled to receive an output of the fourth comparator and an output of the NOR gate; and
a latch having a reset input coupled to an output of the first OR gate and a set input coupled to an output of the second OR gate, wherein the latch is configured to generate the switching frequency signal.

14. The controller of claim 1,
wherein the energy transfer element includes a first output winding and a second output winding,
wherein the hard switch sense circuit is configured to indicate a hard switch event in response to a first rectifier coupled to the first output winding transitioning from a conducting state to a non-conducting state when a delayed switching frequency signal is in a first logic state, and wherein the hard switch sense circuit is further configured to indicate the hard switch event in response to a second rectifier coupled to the second output winding transitioning from the conducting state to the non-conducting state when the delayed switching frequency signal is in a second logic state.

15. The controller of claim 14, wherein the delayed switching frequency signal is the switching frequency signal delayed by a propagation delay.

16. The controller of claim 15, wherein the propagation delay is a fixed value.

17. The controller of claim 15, wherein the propagation delay is a measured value.

18. A power converter, comprising:
an energy transfer element coupled between an input of the power converter and an output of the power converter;
a switching circuit coupled to an input of the energy transfer element and the input of the power converter; and
a controller configured to control switching of the switching circuit to control a transfer of energy from the input of the power converter to the output of the power converter, the controller comprising:
a control loop clock generator configured to generate a switching frequency signal in response to a sense signal representative of a characteristic of the power converter, the control loop clock generator further coupled to receive a load signal responsive to an output load of the power converter, the control loop clock generator further configured to terminate a switching of a half line cycle in response to a hard switch sense output;
a hard switch sense circuit configured to generate the hard switch sense output in response to the switching frequency signal and a rectifier conduction signal representative of a polarity of the energy transfer element to determine if power converter switching losses occur due to hard switching; and
a request transmitter circuit configured to generate a request signal in response to the switching frequency signal to control switching of the switching circuit, the request signal further configured to terminate the switching of the half line cycle in response to the hard switch sense output.

19. The power converter of claim 18, wherein the power converter is a resonant converter, wherein the power converter further comprises a resonant tank circuit including a tank inductance coupled to a tank capacitance coupled to the switching circuit, wherein the switching circuit includes a high side switch and a low side switch coupled to the resonant tank circuit.

20. The power converter of claim 19, wherein the controller is a secondary controller, wherein the power converter further comprises a primary controller galvanically isolated from the secondary controller, wherein the primary controller is coupled to receive the request signal from the secondary controller to generate a high side drive signal to control switching of the high side switch and a low side drive signal to control switching of the low side switch.

21. The power converter of claim 18, wherein the sense signal is representative of at least one of an input voltage of the power converter, an output power of the power converter, an input power of the power converter, or a power processed by the power converter.

22. The power converter of claim 18, wherein the controller further comprises a feedback reference circuit having a first input coupled to receive a feedback signal and a second input coupled to receive a feedback reference signal, wherein the feedback reference circuit is configured to generate the load signal in response to the feedback signal and the feedback reference signal.

23. The power converter of claim 22, further comprising a compensation circuit coupled to an output return of the power converter and an output of the feedback reference circuit, wherein the compensation circuit comprises:
a resistor coupled to a first capacitor coupled between the output return of the power converter and the controller; and
a second capacitor coupled in parallel across the resistor and the first capacitor.

24. The power converter of claim 18, wherein the input of the energy transfer element comprises an input winding, and wherein the output of the energy transfer element comprises a first output winding coupled to a second output winding, wherein the power converter further comprises:
a first rectifier coupled to the first output winding; and
a second rectifier coupled to the second output winding.

25. The power converter of claim 24,
wherein the hard switch sense circuit is configured to indicate a hard switch event in response to the first rectifier transitioning from a non-conducting state to a conducting state when the switching frequency signal is in a first logic state, and
wherein the hard switch sense circuit is further configured to indicate the hard switch event in response to the second rectifier transitioning from the non-conducting state to the conducting state when the switching frequency signal is in a second logic state.

26. The power converter of claim 24, wherein the hard switch sense circuit is coupled to sense a primary current in the input winding substantially equal to zero or flowing in an opposite direction in response to changes in polarity of a voltage of the rectifier conduction signal.

27. The power converter of claim 26,
wherein the rectifier conduction signal comprises a first winding signal representative of conduction in the first rectifier, and a second winding signal representative of conduction in the second rectifier,
wherein the hard switch sense circuit is configured to indicate a hard switch event in the hard switch sense output in response to the first winding signal transitioning from a first state to a second state when the switching frequency signal is in a first logic state, and
wherein the hard switch sense circuit is further configured to indicate the hard switch event in the hard switch sense output in response to the second winding signal transitioning from the first state to the second state when the switching frequency signal is in a second logic state.

28. The power converter of claim 24, wherein the controller further comprises:
a first comparator configured to generate a first winding clock that is coupled to be received by the hard switch sense circuit in response to a winding threshold and a first winding signal coupled that is to be received from the first rectifier; and
a second comparator configured to generate a second winding clock that is coupled to be received by the hard switch sense circuit in response to the winding threshold and a second winding signal coupled to be received from a second rectifier.

29. The power converter of claim 28, wherein the hard switch sense circuit comprises:

a first 1-bit memory unit coupled to be clocked in response to the first winding clock, wherein the first 1-bit memory unit is configured to be responsive to the switching frequency signal, wherein the first 1-bit memory unit is configured to output a first hard switch sense signal; and a second 1-bit memory unit coupled to be clocked in response to the second winding clock, wherein the second 1-bit memory unit includes an inverse reset input coupled to be responsive to the switching frequency signal, wherein the second 1-bit memory unit is configured to output a second hard switch sense signal.

30. The power converter of claim 29, wherein the hard switch sense circuit further comprises:

a second AND gate coupled to receive the switching frequency signal and an inverted delayed switching frequency signal, wherein an output of the second AND gate is coupled to a data input of the first 1-bit memory unit, wherein the first 1-bit memory unit includes the reset input of the first 1-bit memory unit that is configured to be responsive to a delayed switching frequency signal;

a third AND gate coupled to receive an inverted switching frequency signal and the delayed switching frequency signal, wherein an output of the third AND gate is coupled to a data input of the second 1-bit memory unit, wherein the inverse reset input of the second 1-bit memory unit is configured to be responsive to the delayed switching frequency signal; and a third OR gate configured to generate an event signal in response to an output of the first 1-bit memory unit and an output of the second 1-bit memory unit.

31. The power converter of claim 30, wherein the hard switch sense circuit is configured to indicate a hard switch event in response to the first rectifier coupled to the first output winding transitioning from a conducting state to a non-conducting state when the delayed switching frequency signal is in a first logic state, wherein the hard switch sense circuit is further configured to indicate the hard switch event in response to the second rectifier coupled to the second output winding transitioning from the conducting state to the non-conducting state when the delayed switching frequency signal is in a second logic state, and wherein the delayed switching frequency signal is the switching frequency signal delayed by a propagation delay.

32. A method of controlling a switching of a power converter, comprising:

receiving a signal representative of a switching on a primary side of the power converter delayed by a propagation delay;

monitoring a first winding clock signal and a second winding clock signal representative of secondary side rectifier conduction;

terminating a current half cycle of the switching of the power converter if there is a leading edge in the first winding clock signal when there is a first logic state in a switching frequency signal or if there is a leading edge in the second winding clock signal when there is a second logic state in the switching frequency signal;

determining a phase angle between the switching on the primary side of the power converter and the first winding clock signal and the second winding clock signal, wherein the phase angle is defined as a duration of time between either a high side switch or low side switch and a polarity change in the first winding clock signal or the second winding clock signal; and setting a length of a half cycle of the switching of the power converter in response to the switching frequency signal if there is no leading edge in the first winding clock signal when there is the first logic state in the switching frequency signal or if there is no leading edge in the second winding clock signal when there is the second logic state in the switching frequency signal.

33. The method of claim 32, wherein receiving the signal representative of the switching on the primary side of the power converter comprises receiving the switching frequency signal.

34. The method of claim 32, wherein receiving the signal representative of the switching on the primary side of the power converter comprises receiving a request signal.

35. The method of claim 32, further comprising calculating and limiting a length of a next half cycle of the switching frequency signal based a measured current half cycle if the phase angle between the switching on the primary side of the power converter and the first winding clock signal and the second winding clock signal is less than a threshold.

36. The method of claim 32, wherein the phase angle between the switching on the primary side of the power converter and the first winding clock signal and the second winding clock signal is less than a threshold if there is a leading edge in the second winding clock signal before there is a trailing edge in a switching frequency signal delayed by the propagation delay or if there is a leading edge in the first winding clock signal before there is a leading edge in the switching frequency signal delayed by the propagation delay.

37. The method of claim 32, further comprising setting the length of a half cycle of the switching of the power converter in response to the switching frequency signal if the phase angle between the switching on the primary side of the power converter and the first winding clock signal and the second winding clock signal is not less than the threshold.

* * * * *